(12) United States Patent
Gandhi et al.

(10) Patent No.: US 9,281,735 B2
(45) Date of Patent: Mar. 8, 2016

(54) FLUX-SWITCHING LINEAR PERMANENT MAGNET MACHINE WITH YOKELESS TRANSLATOR

(71) Applicant: RENSSELAER POLYTECHNIC INSTITUTE, Troy, NY (US)

(72) Inventors: Arun Gandhi, Troy, NY (US); Leila Parsa, Green Island, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 398 days.

(21) Appl. No.: 13/734,404

(22) Filed: Jan. 4, 2013

(65) Prior Publication Data

US 2013/0249324 A1 Sep. 26, 2013

Related U.S. Application Data

(60) Provisional application No. 61/631,512, filed on Jan. 5, 2012.

(51) Int. Cl.
*H02K 41/02* (2006.01)
*H02K 41/03* (2006.01)
*H02K 15/03* (2006.01)

(52) U.S. Cl.
CPC .............. *H02K 41/033* (2013.01); *H02K 15/03* (2013.01); *Y10T 29/49009* (2015.01)

(58) Field of Classification Search
CPC ............................. H02K 15/03; H02K 41/033
USPC ....................... 310/12.15, 12.18, 12.21–12.24
See application file for complete search history.

(56) References Cited

U.S. PATENT DOCUMENTS

| | | | | |
|---|---|---|---|---|
| 4,581,553 | A * | 4/1986 | Moczala | 310/12.22 |
| 6,025,659 | A * | 2/2000 | Nashiki | 310/12.18 |
| 6,674,186 | B2 * | 1/2004 | Yajima et al. | 310/12.17 |
| 7,893,569 | B2 * | 2/2011 | Jajtic et al. | 310/12.18 |
| 2006/0076839 | A1 * | 4/2006 | Kawai | 310/12 |
| 2006/0131985 | A1 | 6/2006 | Qu et al. | |
| 2007/0252444 | A1 * | 11/2007 | Sadakane et al. | 310/12 |
| 2008/0185932 | A1 * | 8/2008 | Jajtic et al. | 310/181 |
| 2009/0039717 | A1 * | 2/2009 | Jajtic et al. | 310/46 |
| 2012/0286592 | A1 * | 11/2012 | Bojiuc et al. | 310/12.24 |
| 2014/0049124 | A1 * | 2/2014 | Gandhi et al. | 310/46 |

FOREIGN PATENT DOCUMENTS

WO    WO 02/15229    2/2002

OTHER PUBLICATIONS

Bianchi N et al., "Strategies for the fault-tolerant current control of a five-phase permanent-magnet motor," IEEE Transactions on Industry Applications, Jul./Aug. 2007, vol. 43 (4): 960-970.

(Continued)

*Primary Examiner* — Thanh Lam
(74) *Attorney, Agent, or Firm* — Saliwanchik, Lloyd & Eisenschenk

(57) ABSTRACT

Advantageous motors, such as flux-switching linear synchronous motors (FSLSMs) are provided. In an FSLSM, all magnets can be magnetized in the same direction. In addition, an FSLSM can be yokeless and can have two stators displaced from one another by half a pole pitch. FSLSMs of the subject invention are cost-effective and provide high thrust, and can operate well even under fault conditions.

20 Claims, 34 Drawing Sheets

(56) References Cited

OTHER PUBLICATIONS

Chen Y et al., "Starting torque of single-phase flux-switching permanent magnet motors," IEEE Transactions on Magnetics, Oct. 2006, vol. 42 (10): 3416-3418.
Dwari S et al., "An optimal control technique for multiphase PM machines under open-circuit faults," IEEE Transactions for Industrial Electronics, May 2008, vol. 55 (5): 1988-1995.
Gandhi A et al., "Double-sided FRLSN for long-stroke safety-critical applications," IECON 2011—37th Annual Conference on IEEE Industrial Electronics Society, Nov. 2011, p. 4186-4191.
Gurol H, "General atomics linear motor applications: Moving towards deployment," Proceedings of the IEEE, Nov. 2009, vol. 97 (11): 1864-1871.
Hodgins N et al., "Design and testing of a linear generator for wave-energy applications," IEEE Transactions on Industrial Electronics, May 2012, vol. 59 (5): 2094-2103.
Hua W et al., "Analysis and optimization of back EMF waveform of a flux-switching permanent magnet motor," IEEE Transactions on Energy Conversion, Sep. 2008, vol. 23 (3): 727-733.
Hwang C et al., "Optimal design of a permanent magnet linear synchronous motor with low cogging force," IEEE Transactions on Magnetics, Feb. 2012, vol. 48 (2): 1039-1042.
Isfahani A et al., "Design optimization of a low-speed sing-sided linear induction motor for improved efficiency and power factor," IEEE Transactions on Magnetics, Feb. 2008, vol. 44 (2): 266-272.
Jin M et al., "A modular permanent-magnet flux-switching linear machine with fault-tolerant capability," IEEE Transactions on Magnetics, Aug. 2009, vol. 45 (8): 3179-3186.
Krop D et al., "Analysis of a novel double sided flux switching linear motor topology," XIX International Conference on Electrical Machines, Sep. 2010, p. 1-5.
Lee B.-H. et al., "Optimum shape design of single-sided linear induction motors using response surface methodology and finite-element method," IEEE Transactions on Magnetics, Oct. 2011, vol. 47 (10): 3657-3660.
Lim H et al., "Ropeless elevator with linear switched reluctance motor drive actuation systems," IEEE Transactions on Industrial Electronics, Aug. 2007, vol. 54 (4): 2209-2218.
Min W et al., "Optimization and comparison of novel e-core and c-core linear switched flux PM machines," IEEE Transactions on Magnetics, Aug. 2011, vol. 47(8): 2134-2141.
Mirzaei M et al., "A large linear interior permanent magnet motor for electromagnetic launcher," IEEE Transactions on Electromagnetic Launcher, Jun. 2011, vol. 39 (6): 1566-1570.
Rhinefrank K et al., "Comparison of direct-drive takeoff systems for ocean wave energy applications," IEEE Journal of Oceanic Engineering, Jan. 2012, vol. 37 (1): 35-44.
Thompson M, "Practical issues in the use of NdFeB permanent magnets in maglev, motors, bearings, and eddy current brakes," Proceedings of the IEEE, Nov. 2009, vol. 97 (11): 1758-1767.
Vaez-Zadeh S et al., "Multiobjective design optimization of air-core linear permanent-magnet synchronous motors for improved thrust and low magnet consumption," IEEE Transactions on Magnetics, Mar. 2006, vol. 42 (3): 446-452.
Vermaak R et al., "Design aspects of a novel topology air-cored permanent magnet linear generator for direct drive wave energy converters," IEEE Transactions on Industrial Electronics, May 2012, vol. 59 (5): 2014-2115.
Wang H et al., "A genetic algorithm combined with finite element method for robust design of actuators," IEEE Transactions on Magnetics, Jul. 2000, vol. 36 (4): 1128-1131.
Wang J et al., "Comparative studies on linear motor topologies for reciprocating vapor compressors," IEEE International Electric Machines Drives Conference, 2007, May 2007, vol. 1: 364-369.
Wang J et al., "A tubular flux-switching permanent magnet machine," Journal of Applied Physics, Apr. 2008, vol. 103 (7):07F105-07F105-3.
Woolmer T et al., "Analysis of the yolkless and segmented armature machine," IEEE International Electric Machines Drives Conference, 2007, May 2007, vol. 1: 704-708.
Zhao W et al, "Remedial injected-harmonic-current operation of redundant flux-switching permanent-magnet motor drives," IEEE Transactions on Industrial Electronics, Jan. 2013, vol. 60(1): 151-159.
Zheng P et al., "Investigation of a novel five-phase modular permanent-magnet in-wheel motor," IEEE Transactions on Magnetics, Oct. 2011, vol. 47(10): 4084-4087.
Zhou G et al., "Analysis method to a halbach PM ironless linear motor with trapezoid windings," IEEE Transactions on Magnetics, Oct. 2011, vol. 47 (10): 4167-4170.
Zhu Z et al., "Analysis of electromagnetic performance of flux-switching permanent-magnet machines by nonlinear adaptive lumped parameter magnetic circuit model," IEEE Transactions on Magnetics, Nov. 2005, vol. 41 (11): 4277-4287.
Zhu Z et al., "Advanced flux-switching permanent magnet brushless machines," IEEE Transactions on Magnetics, Jun. 2010, vol. 46 (6): 1447-1453.

\* cited by examiner (a)

(b)

(a)

(b)

FLUX-SWITCHING LINEAR PERMANENT MAGNET MACHINE WITH YOKELESS TRANSLATOR

CROSS-REFERENCE TO RELATED APPLICATION

The present application claims the benefit of U.S. Provisional Application Ser. No. 61/631,512, filed Jan. 5, 2012, which is hereby incorporated by reference herein in its entirety, including any figures, tables, and drawings.

GOVERNMENT SUPPORT

The subject invention was made with government support under a research project supported by the Office of Naval Research Award No. N00014-09-1-0886. The government has certain rights in this invention.

BACKGROUND

Direct-drive linear machines have been used more frequently in several areas, including in industrial applications. Recent trends have led to such machines being used in place of more traditional hydraulic, pneumatic, or geared electric actuators when linear motion is desired. Typical linear motors have the magnets in the translator and the windings in the stator or vice versa. For long-stroke applications, these drives become very expensive.

In addition, existing linear machines exhibit poor performance operating under fault conditions, poor thrust versus current linearity characteristics, high detent force, and high saturation effect on thrust. Magnets can also be de-magnetized due to the current in the windings.

BRIEF SUMMARY

The subject invention provides novel and advantageous motors, as well as methods of manufacturing and using such motors. In many embodiments, a motor can have a flux-switching topology and can be a flux-switching linear synchronous motor (FSLSM).

In one embodiment, an FSLSM includes at least two permanent magnets, a coil wrapped around each permanent magnet, and at least one stator. All permanent magnets of the FSLSM are magnetized in the same direction. The FSLSM can have a first stator disposed below the permanent magnets and a second stator disposed above the permanent magnets.

In a further embodiment, all permanent magnets and all coils are encapsulated in a non-magnetic encapsulating material, thereby forming a one-piece translator containing all permanent magnets and all coils of the FSLSM.

In another embodiment, a method of manufacturing an FSLSM includes: providing at least two permanent magnets; providing a coil wound around each permanent magnet; and providing the permanent magnets having coils wound around them on a first stator. All permanent magnets of the FSLSM are magnetized in the same direction.

In a further embodiment, a method of manufacturing an FSLSM also includes encapsulating the permanent magnets and the coils in a non-magnetic encapsulating material, prior to providing the permanent magnets having coils wound around them on the first stator, thereby forming a one-piece translator containing all permanent magnets and all coils of the FSLSM, wherein providing the permanent magnets having coils wound around them on the first stator comprises providing the one-piece translator on the first stator. The method can also include providing a second stator on the one-piece translator.

In yet a further embodiment, a method of manufacturing an FSLSM also includes magnetizing the permanent magnets such that all permanent magnets of the FSLSM are magnetized in the same direction, wherein magnetizing the permanent magnets is performed after the one-piece translator is formed.

DETAILED DISCLOSURE

Figure 1:
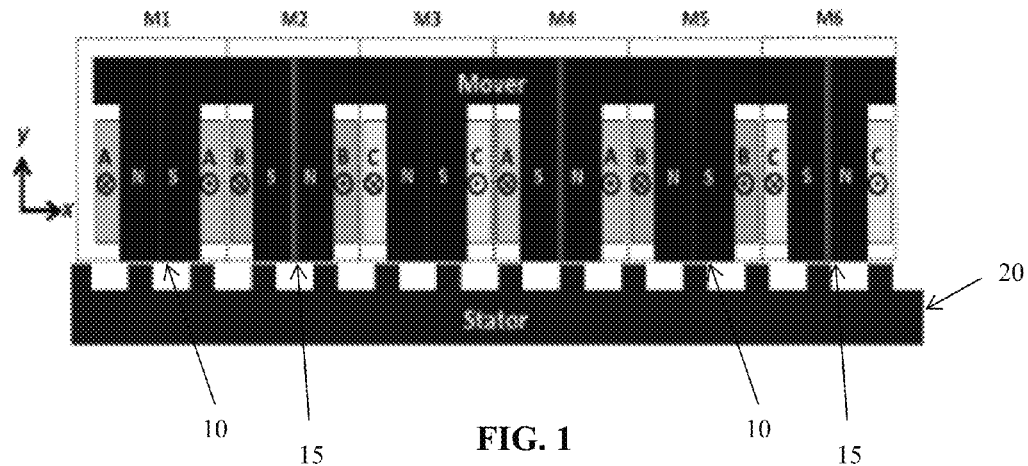
FIG. 1 is a cross-sectional diagram of an existing motor.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated.

The terms "Conventional" and "Proposed" are used in some of the figures. These refer to embodiments of the subject invention ("Proposed") compared with related art devices ("Conventional").

The subject invention provides novel and advantageous motors, as well as methods of manufacturing and using such motors. In many embodiments, a motor of the subject invention is a direct-drive linear motor, such as a motor having a doubly-salient permanent-magnet linear motor (e.g., a doubly-salient permanent-magnet linear motor). In many embodiments, a motor can have a flux-switching topology and can be a flux-switching linear synchronous motor (FSLSM).

Direct-drive linear machines have been increasingly preferred over hydraulic, pneumatic, or geared electric actuators in many industrial applications. Linear machines can have a variety of different topologies. Doubly-salient permanent-magnet (PM) linear motor topologies, such as flux-reversal and flux-switching motors, provide certain advantages. In either of these topologies, all excitation sources can be in the same part of the machine and therefore can be very cost-effective for certain applications (e.g., long-stroke applications). In an FSLSM, magnetic field and armature field are often perpendicular to each other, which can lead to relatively high force density. Also, the magnets may not be demagnetized easily in case there are excess currents due to faults.

In one embodiment of the subject invention, a motor can have a double-sided topology. A motor of the subject invention can have a mover carrying coils and/or one or more PMs. Such a motor can be surrounded on either side by a stator. In certain embodiments, such a motor can be surrounded by a stator or stators on both sides. Such a motor has several advantages over existing motors, such as a C-core FSLSM.

In embodiments of the subject invention, a motor can include two or more PMs, and all PMs can be magnetized in the same direction. Such a configuration is unique, as existing FSLSMs use oppositely-oriented magnets, and this unique configuration of the subject invention provides improved performance.

In many embodiments, a motor (e.g., an FSLSM) of the subject invention can have at least two magnets (e.g., PMs). The number of magnets present in a motor of the subject invention can be, for example, any of the following values, at least any of the following values, at most any of the following values, or within any range having any of the following values as endpoints, though embodiments are not limited thereto: 2, 3, 4, 5, 6, 7, 8, 9, 10, 11, 12, 13, 14, 15, 16, 17, 18, 19, 20, 25, 30, 35, 40, 45, 50, or 100. For example, the number of magnets present in a motor of the subject invention can be five or six.

The topology of an existing (conventional) 3-phase C-core FSLSM is shown in FIG. 1. Referring to FIG. 1, the motor can include magnets 10,15 and a stator 20. The motor is shown with six slots and 13 poles, as this configuration has been found to have the highest thrust density [1]. The motor in FIG. 1 is also shown with three phases (labeled A, B, and C). The motor has magnets 10,15 magnetized in different directions. That is, magnets in adjacent teeth (10, 15) are oppositely magnetized.

Figure 2:
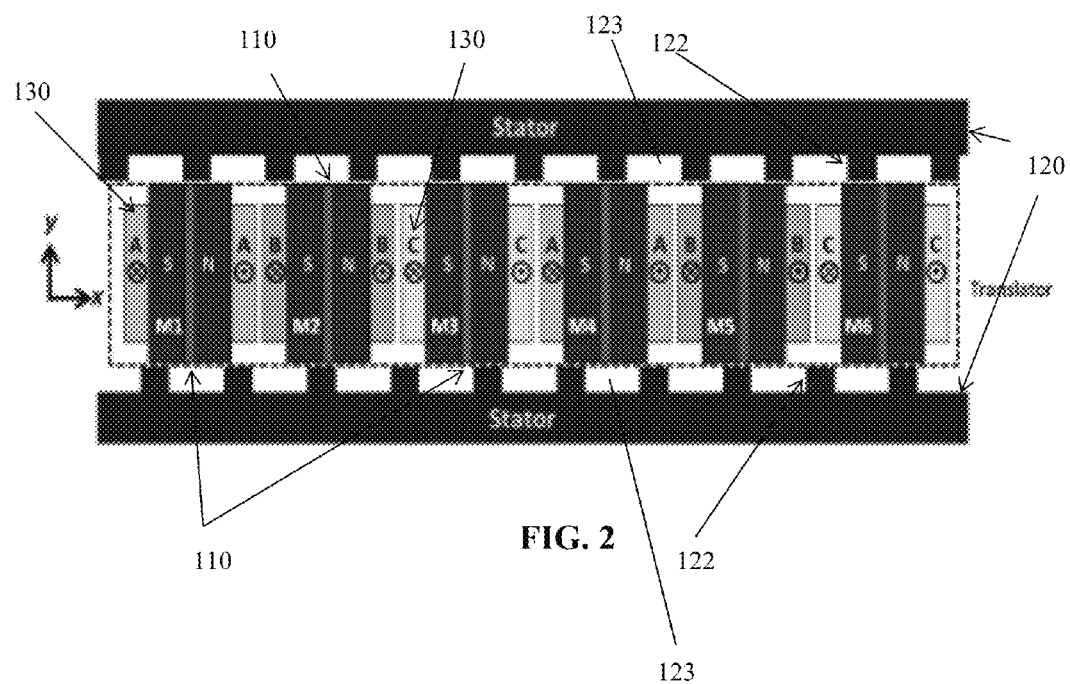
FIG. 2 is a cross-sectional diagram of a motor according to an embodiment of the subject invention.

FIG. 2 is a cross-sectional diagram showing the topology of an FSLSM according to one embodiment of the subject invention. Referring to FIG. 2, an FSLSM can include one or more magnets 110, one or more coils 130, and at least one stator 120. In many embodiments, the magnets 110 are PMs, and an FSLSM will include at least two PMs 110. The FSLSM can be configured such that all PMs 110 are magnetized in the same direction, as shown in FIG. 2. The motor shown in FIG. 2 is a 3-phase, 6-slot/10-pole motor, though embodiments are not limited thereto; the motor shown in FIG. 2 is for exemplary purposes only. Though FIG. 2 shows six PMs for exemplary purposes, embodiments are not limited thereto. Also, though FIG. 2 shows two stators 120 for exemplary purposes, embodiments are not limited thereto. For example, a motor can have just one stator 120. Further, though FIG. 2 shows three phases (labeled A, B, and C) for exemplary purposes, embodiments are not limited thereto.

The number of phases present in a motor of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of phases present in a motor of the subject invention can be 3 or 5.

The number of slots present in a motor of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of slots present in a motor of the subject invention can be 5 or 6.

The number of poles present in a motor of the subject invention can be, for example, any of the following values, at least any of the following values, at most any of the following values, or within any range having any of the following values as endpoints, though embodiments are not limited thereto: 1, 2, 3, 4, 5, 6, 7, 8, 9, 10, 11, 12, 13, 14, 15, 16, 17, 18, 19, 20, 25, 30, 35, 40, 45, 50, or 100. For example, the number of poles present in a motor of the subject invention can be 10.

In one embodiment, an FSLSM can have two stators 120, and the two stators can be displaced from each other by, e.g., half a pole-pitch. That is, the stators 120 can be configured such that the teeth 122 from one stator line up with the gaps 123 from the other stator, and vice versa. Such a configuration is shown in FIG. 2. A displacement as described can help maintain symmetry for flux flow.

In many embodiments, one or more of the magnets 110 can have a coil 130 wrapped around it. For example, each magnet 110 present can have a coil 130 wrapped around it. The windings of the coil 130 can be concentrated.

In many embodiments, an FSLSM can be yokeless. The term yokeless means that no yoke is present in the FSLSM; that is, the FSLSM is configured to not have a yoke. For example, the FSLSM can be without a back-iron in the mover. In certain embodiments, the mover components are held together with a non-magnetic material (an "encapsulator"). The encapsulator can be any suitable material known in the art, for example, an epoxy. In a particular embodiment, the encapsulator is aluminum with a thermally conductive epoxy resin.

Figure 5:
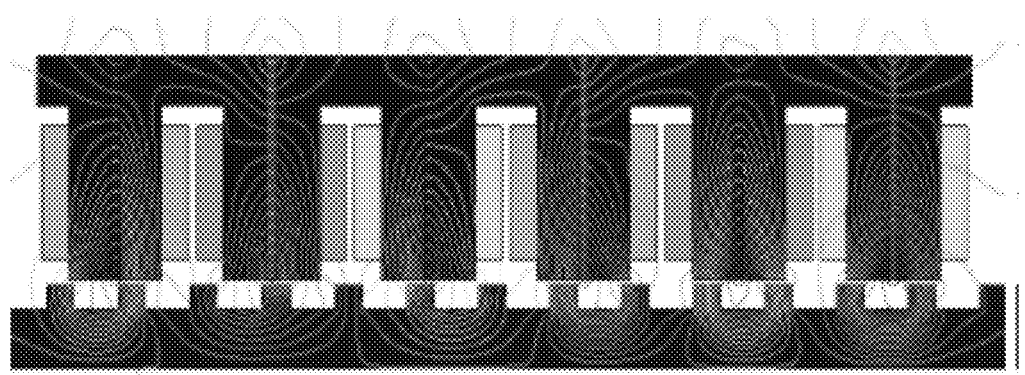
FIG. 5 is a cross-sectional diagram showing open-circuit flux lines of an existing motor.
Figure 6:
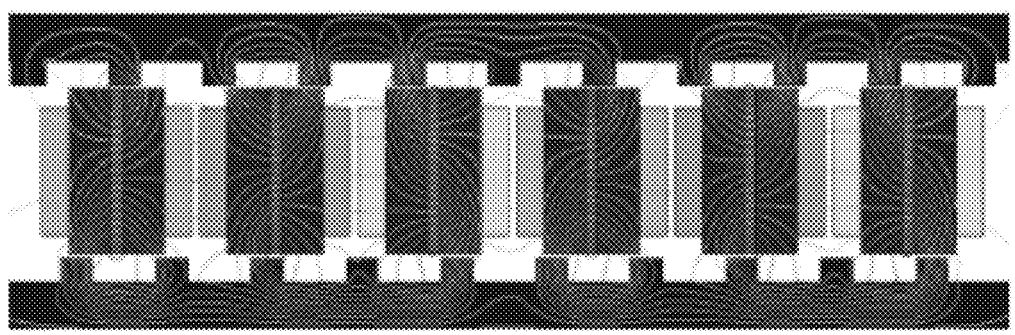
FIG. 6 is a cross-sectional diagram showing open-circuit flux lines of a motor according to an embodiment of the subject invention.
Figure 59:
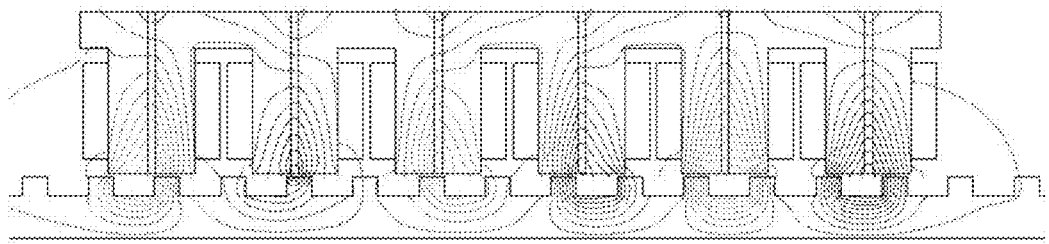
FIG. 59 is a cross-sectional diagram showing open-circuit flux lines of an existing motor.
Figure 60:
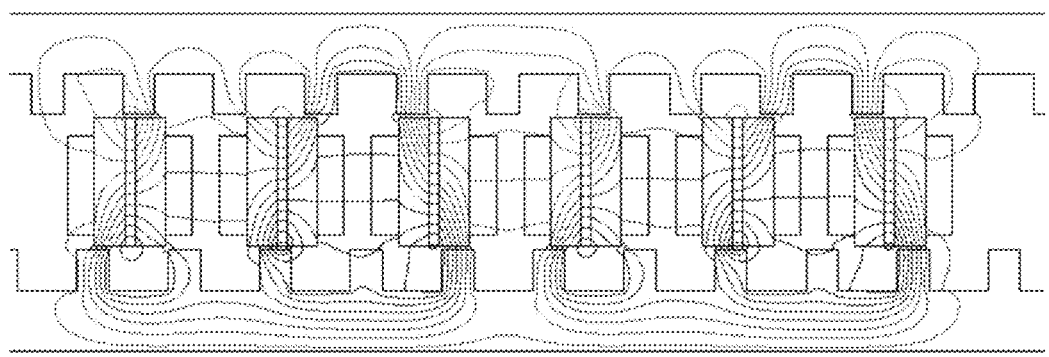
FIG. 60 is a cross-sectional diagram showing open-circuit flux lines of a motor according to an embodiment of the subject invention.

FIGS. 5 and 59 show open-circuit flux lines for the motor shown in FIG. 1, and FIGS. 6 and 60 show open-circuit flux lines for a motor according to the subject invention (for example, the motor shown in FIG. 2). The motor of the subject invention utilizes the width of winding slots to focus the flux through stator teeth.

Figure 20:
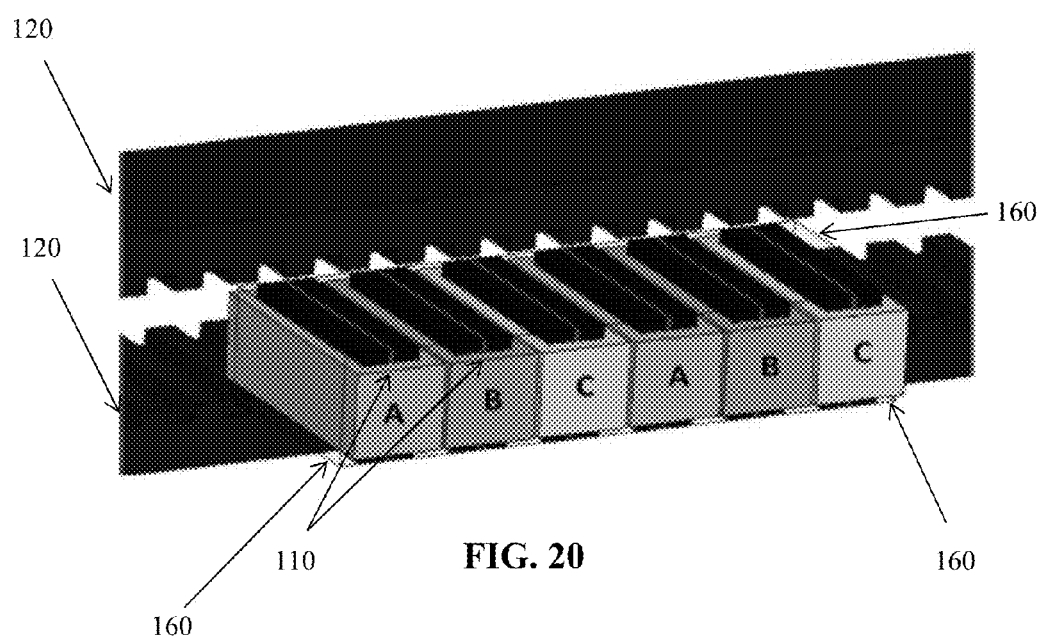
FIG. 20 is a perspective view of a motor according to an embodiment of the subject invention.

FIG. 20 shows a perspective view of an FSLSM according to an embodiment of the subject invention. Referring to FIG. 20, the mover is pulled out of the page for illustrative purposes. The mover can have a very modular structure that can simplify the construction process. A yokeless motor is shown in FIG. 20, and all of the mover components (e.g., magnets 110, coils 130, and mover parts (labeled A, B, C)) can be encapsulated by a non-magnetic encapsulating material 160 (e.g., epoxy). The stator(s) 120 is/are not encapsulated by the encapsulating material 160.

Figure 58:
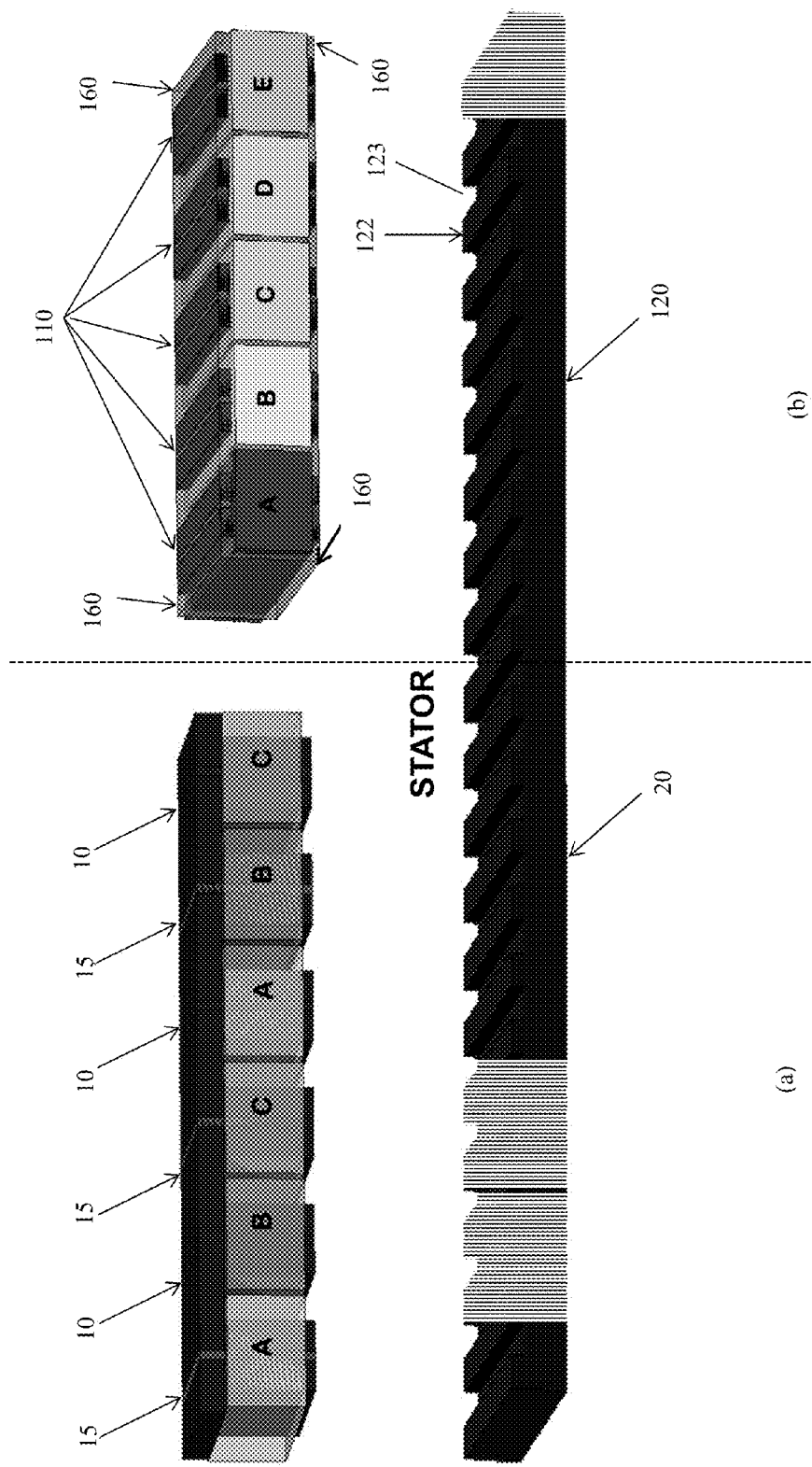
FIG. 58a is a perspective view of a portion of an existing motor.
FIG. 58b is a perspective view of a motor according to an embodiment of the subject invention.

FIG. 58 shows a side-by-side perspective view comparison of a portion of an existing FSLSM (FIG. 58a) and an FSLSM according to an embodiment of the subject invention (FIG. 58b). Referring to FIG. 58b, the mover of an FSLSM according to an embodiment of the subject invention can have a very modular structure that can simplify the construction process. All of the mover components (e.g., magnets 110, coils 130, and mover parts (labeled A, B, C, D, E)) can be encapsulated by a non-magnetic encapsulating material 160 (e.g., epoxy). The stator(s) 120 is/are not encapsulated by the encapsulating material 160. All magnets 110 are PMs and are magnetized in the same direction. Referring to FIG. 58a, the mover of the existing FSLSM is shown separated from the stator 20. Adjacent magnets 10, 15 are oppositely magnetized.

FSLSMs according to the subject invention are capable of very high thrust. Additionally, in certain embodiments, the FSLSM can have an average normal force of zero or very close to zero. The FSLSM can also have excellent thrust versus current linearity and symmetrical back-emfs. Thrust-current linearity is highly preferable in certain high precision applications.

FSLSMs of the subject invention are suitable for many applications, including, but not limited to, transportation/conveyor applications, vertical elevators, conveyor belts, linear generators in tidal or wave-energy-based power generation, and plunger-type applications.

In one embodiment, the role of the stator and the translator can be reversed to have a double-sided translator. Such a translator can be made of, for example, only steel. This configuration can be used in applications that require short oscillatory type of strokes.

In many embodiments of the subject invention, an FSLSM can include a translator carrying coils and PMs. The translator can be surrounded on either side (e.g., the top and the bottom) by stators. For example, referring to FIGS. 20 and 58, the "translator" would be the portion of the FSLSM enclosed in the encapsulating material 160, though embodiments are not limited to those having an encapsulating material. Manufacturing of the motor is simpler than for existing motors as magnets can be magnetized after attaching to the translator.

In a particular embodiment, the encapsulator material can be a thermally conductive epoxy resin (e.g., 50-3185 NC, available from Epoxies, etc.). Such resins have tensile strengths of more than 8,000 psi and a shore-D hardness of more than 94, which is sufficient for encapsulating a translator of an FSLSM of the subject invention.

In one embodiment, the translator can be assembled the same way as the rotor/translator of a typical slot-less PM machine [2], where, e.g., the coils of the different phases are held together by a resin.

In one embodiment, the nominal current density in an FSLSM of the subject invention can be maintained at less than 6 A/mm². In certain embodiments, air-cooling alone is sufficient to cool the FSLSM with such a current density.

Each magnet present in the motors of the subject invention can be made of any suitable material known in the art. For example, magnets can be made of neodymium ferrite boron (NdFeB), though embodiments are not limited thereto. In a specific embodiment, magnets can be made of NdFeB-30.

Each stator present in the motors of the subject invention can be made of any suitable material known in the art. For example, each stator can be made of steel, such as carbon steel or laminated carbon steel (e.g., laminated carbon steel 1010), though embodiments are not limited thereto.

Each coil present in the motors of the subject invention can be made of any suitable material known in the art. For example, coils can be made of copper, though embodiments are not limited thereto.

In certain embodiments, a motor can include one or more shafts. Each shaft present in the motors of the subject invention can be made of any suitable material known in the art. For example, shafts can be made of steel (e.g., stainless steel), though embodiments are not limited thereto.

Figure 21:
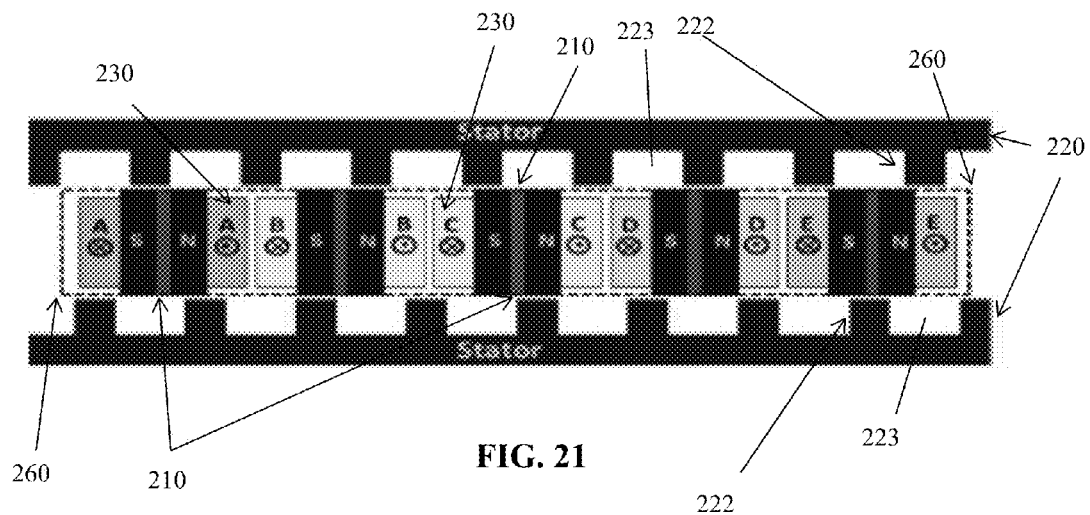
FIG. 21 is a cross-sectional diagram of a motor according to an embodiment of the subject invention.
Figure 22:
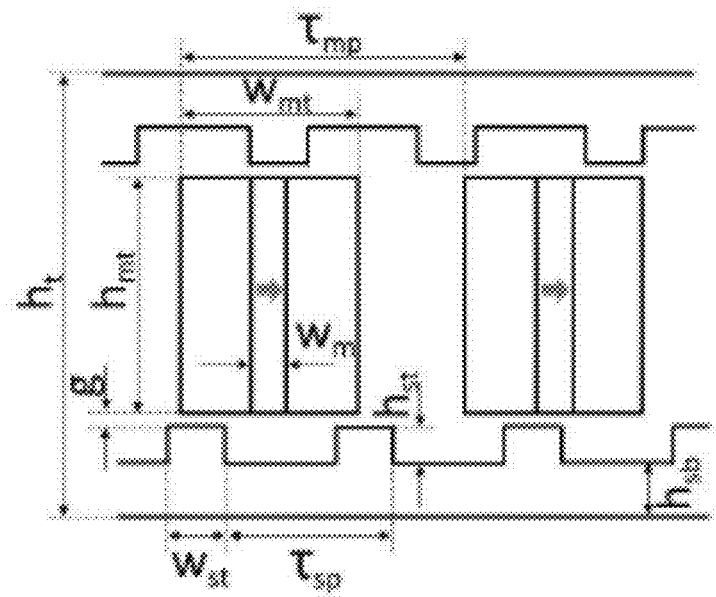
FIG. 22 is a cross-sectional diagram of a motor according to an embodiment of the subject invention.
Figure 23:
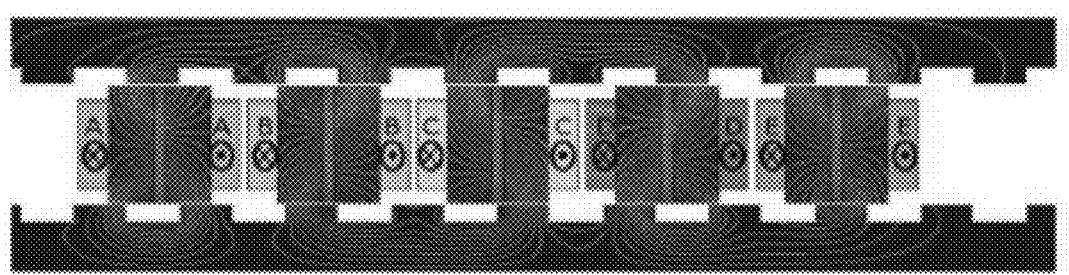
FIG. 23 is a cross-sectional diagram showing open-circuit flux lines of a motor according to an embodiment of the subject invention.
Figure 63:
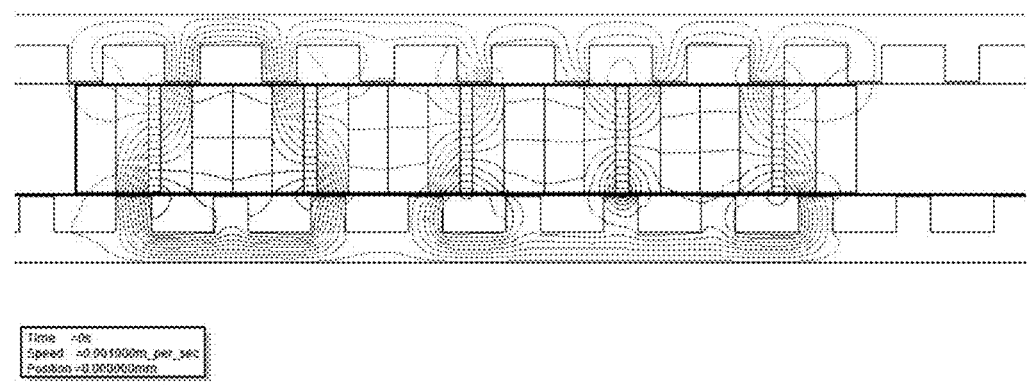
FIG. 63 is a cross-sectional diagram showing open-circuit flux lines of a motor according to an embodiment of the subject invention.

In one embodiment, an FSLSM can have a five-phase topology. Cross-sectional diagrams of a five-phase FSLSM are shown in FIGS. 21 and 22. Referring to FIG. 21, the FSLSM can include one or more magnets 210, one or more coils 230, and at least one stator 220. In many embodiments, the magnets 210 are PMs, and an FSLSM will include at least two PMs 210. The FSLSM can be configured such that all PMs 210 are magnetized in the same direction, as shown in FIG. 21. Though FIG. 2 shows six PMs for exemplary purposes, embodiments are not limited thereto. Also, though FIG. 21 shows two stators 220 for exemplary purposes, embodiments are not limited thereto. For example, a motor can have just one stator 220. FIGS. 23 and 63 show open-circuit flux lines for the motor shown in FIG. 21.

In one embodiment, a five-phase FSLSM can have two stators 220, and the two stators can be displaced from each other by, e.g., half a pole-pitch. That is, the stators 220 can be configured such that the teeth 222 from one stator line up with the gaps 223 from the other stator, and vice versa. Such a configuration is shown in FIG. 21. A displacement as described can help maintain symmetry for flux flow.

In many embodiments, one or more of the magnets 210 can have a coil 230 wrapped around it. For example, each magnet 210 present can have a coil 230 wrapped around it. The windings of the coil 230 can be concentrated.

In many embodiments, a five-phase FSLSM can be yoke-less. For example, the FSLSM can be without a back-iron in the mover. In certain embodiments, the mover components, making up the translator, are held together with an encapsulator 260 as discussed herein. The stator(s) 220 is/are not encapsulated by the encapsulating material 260.

In many embodiments, the translator of an FSLSM contains all the coils and all the PMs. This construction can be suitable for long-stroke applications as the number of coils and PMs required becomes independent (or essentially independent) of the stroke length. A role reversal of the translator and stators can make the FSLSM suitable for short-stroke oscillatory applications, where the coils and the PMs are stationary and only the stators (e.g., steel stators) on either side move. Also, FSLSMs of the subject invention can operate as a linear generator.

Figure 4:
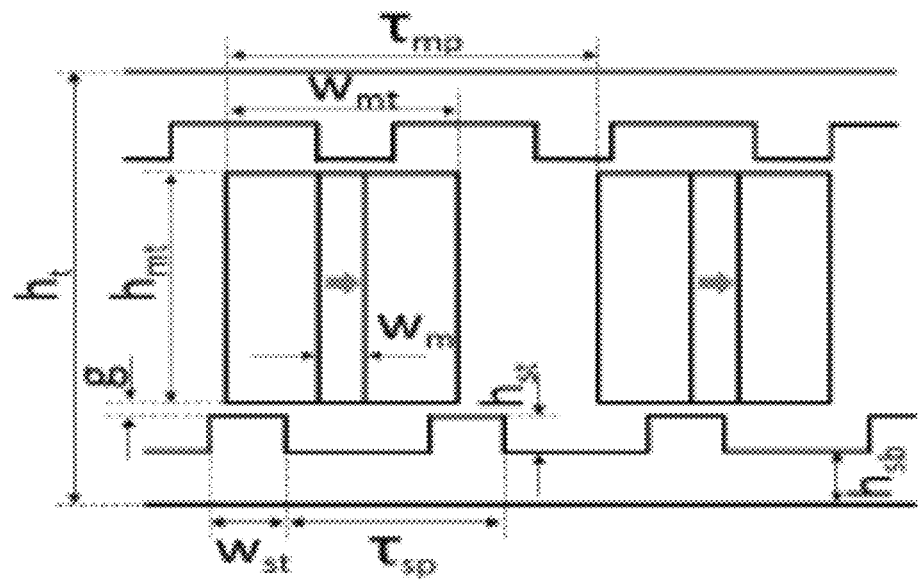
FIG. 4 is a cross-sectional diagram of a motor according to an embodiment of the subject invention.

In an FSLSM of the subject invention:

split ratio can be defined as $(h_{st}+h_{sb})/h_t$;

stator tooth width ratio can be defined as $w_{st}/\tau_{sp}$;

stator tooth height ratio can be defined as $h_{st}/(h_{st}+h_{sb})$; and translator tooth width ratio can be defined as $(w_{mt}-w_m)/2\tau_{mp}$, where:

$h_{st}$ is stator tooth height;

$h_{sb}$ is stator back-iron width;

$h_t$ is distance between back ends of stators;

$w_{st}$ is stator tooth width;

$\tau_{sp}$ is the pole pitch or stator teeth "wavelength" (i.e., the distance from the right side of a stator tooth to the right side of an adjacent stator tooth or the distance from the center of a stator tooth to the center of an adjacent stator tooth, etc.);

$w_{mt}$ is translator tooth width;

$w_m$ is magnet width; and $\tau_{mp}$ is the magnet pole pitch or coil "wavelength" (i.e., the distance from the right side of a coil to the right side of an adjacent coil or the distance from the left side of a coil to the left side of an adjacent coil, etc.). See also FIGS. 4 and 22 for examples of how these quantities are measured. In an FSLSM of the subject invention, the following quantities can also be defined:

$h_{mt}$ (also $h_m$) is magnet height;

g is air gap (i.e., the distance between the stator and the translator);

$B_r$ is magnet residual flux density;

D is machine depth; and

L is translator length. Again, see also FIGS. 4 and 22 for examples of how some of these quantities are measured.

The split ratio of an FSLSM can be, for example, any of the following values, about any of the following values, at least any of the following values, at most any of the following values, or within any range having any of the following values as endpoints, though embodiments are not limited thereto (all numerical values are dimensionless): 0.0001, 0.001, 0.01, 0.1, 0.2, 0.21, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.5, 0.6, 0.7, 0.8, or 0.9. For example, the split ratio can be 0.32, about 0.32, 0.27, or about 0.27.

The stator tooth width ratio of an FSLSM can be, for example, any of the following values, about any of the following values, at least any of the following values, at most any of the following values, or within any range having any of the following values as endpoints, though embodiments are not limited thereto (all numerical values are dimensionless): 0.0001, 0.001, 0.01, 0.1, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.6, 0.7, 0.8, or 0.9. For example, the stator tooth width ratio can be 0.35, about 0.35, 0.34, or about 0.34.

The stator tooth height ratio of an FSLSM can be, for example, any of the following values, about any of the following values, at least any of the following values, at most any of the following values, or within any range having any of the following values as endpoints, though embodiments are not limited thereto (all numerical values are dimensionless): 0.0001, 0.001, 0.01, 0.1, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.7, 0.71, 0.72, 0.73, 0.74, 0.75, 0.76, 0.78, 0.79, 0.8, 0.85, or 0.9. For example, the stator tooth height ratio can be 0.4, about 0.4, 0.37, or about 0.37.

The translator tooth width ratio of an FSLSM can be, for example, any of the following values, about any of the following values, at least any of the following values, at most any of the following values, or within any range having any of the following values as endpoints, though embodiments are not limited thereto (all numerical values are dimensionless): 0.0001, 0.001, 0.01, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.35, 0.4, 0.45, 0.5, 0.6, 0.7, 0.8, or 0.9. For example, the translator tooth width ratio can be 0.2, about 0.2, 0.22, or about 0.22.

The pole pitch of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 70, 80, 90, or 100. For example, the pole pitch can be 24 mm or about 24 mm.

The magnet width of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 1.5, 2, 2.5, 2.6, 2.7, 2.74, 2.75, 2.8, 2.85, 2.9, 3, 3.5, 4, 4.5, 5, 5.5, 6, 7, 8, 9, 10, 11, 12, 13, 14, 15, 16, 17, 18, 19, 20, 25, 30, 40, 45, or 50. For example, the magnet width can be 2.74 mm or about 2.74 mm.

The magnet height of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 50, 55, 60, 70, 80, 90, or 100. For example, the magnet height can be 35 mm or about 35 mm.

The magnet pole pitch of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 15, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 60, 70, 80, 90, or 100. For example, the magnet pole pitch can be 40 mm or about 40 mm.

The air gap of an FSLSM can be, for example, any of the following values, about any of the following values, at least any of the following values, at most any of the following values, or within any range having any of the following values as endpoints, though embodiments are not limited thereto (all numerical values are in mm): 0.001, 0.01, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 4, 5, 6, 7, 8, 9, or 10. For example, the air gap can be 1 mm or about 1 mm.

The stator tooth width of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 10, 11, 12, 13, 14, 15, 16, 17, 18, 19, 20, 21, 22, 23, 24, 25, 26, 27, 28, 29, or 30. For example, the stator tooth width can be 8.4 mm or about 8.4 mm.

The stator tooth height of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 13, 14, 15, 16, 17, 18, 19, 20, 21, 22, 23, 24, 25, 26, 27, 28, 29, or 30. For example, the stator tooth height can be 11.1 mm or about 11.1 mm.

The translator tooth width of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 11, 12, 13, 14, 15, 16, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.74, 18.75, 18.8, 18.9, 19, 20, 21, 22, 23, 24, 25, 26, 27, 28, 29, 30, 31, 32, 33, 34, 35, 36, 37, 38, 39, 40, 45, or 50. For example, the translator tooth width can be 18.74 mm or about 18.74 mm.

The residual flux density of an FSLSM can be, for example, any of the following values, about any of the following values, at least any of the following values, at most any of the following values, or within any range having any of the following values as endpoints, though embodiments are not limited thereto (all numerical values are in Tesla): 0.001, 0.01, 0.1, 0.2, 0.3, 0.4, 0.5, 0.6, 0.7, 0.8, 0.9, 0.95, 1, 1.05, 1.1, 1.15, 1.2, 1.25, 1.3, 1.35, 1.4, 1.5, 1.6, 1.7, 1.8, 1.9, 2, 3, 4, 5, 6, 7, 8, 9, or 10. For example, the pole pitch can be 1.15 T or about 1.15 T.

The machine depth of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 20, 30, 40, 50, 55, 60, 65, 70, 75, 80, 85, 90, 95, 100, 105, 110, 115, 120, 125, 130, 135, 140, 145, 150, 160, 170, 180, 190, 200, 210, 220, 230, 240, 250, 275, 300, 350, 400, 450, 500, or 1000. For example, the machine depth can be 100 mm or about 100 mm.

The translator length of an FSLSM can be, for example, any of the following values, about any of the following values, at least any of the following values, at most any of the following values, or within any range having any of the following values as endpoints, though embodiments are not limited thereto (all numerical values are in mm): 0.5, 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 231, 232, 233, 234, 235, 236, 237, 238, 239, 240, 250, 260, 270, 280, 290, 300, 300, 325, 350, 375, 400, 450, 500, or 1000. For example, the translator length can be 240 mm or about 240 mm.

In one embodiment, a method of manufacturing an FSLSM includes providing at least two permanent magnets, providing a coil wound around each permanent magnet, and providing the permanent magnets having coils wound around them on a stator.

In a further embodiment, the method includes encapsulating the magnets and coils in a non-magnetic material (as discussed herein) before providing them on the stator.

In yet a further embodiment, the method includes providing a second stator over the coil-wound magnets. The order in which the stators are provided does not matter; i.e., the second stator can be provided on the coil-wound magnets before the first stator is provided under the coil-wound magnets, or vice versa. The stators can be provided such that they are displaced from each other by half a pole pitch, i.e., such that the stator teeth of one stator are aligned with the teeth gaps between the stator teeth of the other stator and vice versa.

In yet a further embodiment, the method includes magnetizing the magnets such that all magnets are magnetized in the same direction. In a particular embodiment, the magnets can be magnetized after coils are wound around the magnets or even after the magnets are provided on or under at least one stator. That is, the magnets can be magnetized externally.

In further embodiments, the method can include forming the magnets, forming the coils, and/or forming the stator(s).

In one embodiment, a method of using an FSLSM as described herein includes providing an FSLSM as described herein and using it according to its normal functions. For example, an FSLSM can be used to provide actuation.

FSLSMs according to embodiments of the subject invention have several advantages over existing motors. Flux-switching topology combines the advantages of both switched reluctance machines and PM machines and thereby gives high thrust density.

The use of a yokeless translator in embodiments of the subject invention allows very good thrust versus current linearity, which is highly beneficial—for example, when overloading the machine due to emergency situations.

The highly modular structure of the FSLSM allows it to operate with several different numbers of phases (e.g., three, five, etc.). The construction of the machine is easy due to the modular structure.

Also, the detent force is very low (e.g., <1% of thrust) for unique slot-pole combinations of the device. In addition, the motor can be modified easily to have either sinusoidal or trapezoidal back-emf depending on the application.

FSLSMs of the subject invention are highly cost effective for long-stroke applications as the PMs and coils are confined to only the active part of the machine. With multiple phases, the machine can be operated well even under fault conditions. Also, the saturation effect on the thrust is small due to the yokeless topology and consequently, the device can be controlled easily to have low thrust ripples even under fault conditions.

Further, there is little concern about demagnetizing the magnets as the field due to PMs is perpendicular to the field due to currents in the windings. Permanent magnets that are embedded in the mover iron are all magnetized in the same direction. During construction of the machine, this is highly beneficial as the mover can be built first, and then magnetized externally.

Moreover, because the windings (i.e., coils) and the PMs can be mounted on the same part of the device, thermal management is easier. When the excitation sources are mounted on the stationary part of the machine, the translator can be made of one material (e.g., silicon, steel, or silicon steel), thereby making the machine mechanically rugged.

Magnetic pollution is very low even for long stroke applications because all the sources are confined to a smaller volume. The device is modular, easy to assemble, and can be easily controlled. The modular nature of the device allows it to be operated with multiple phases easily and can be designed to be highly fault-tolerant. From a performance point of view, the device has very low thrust ripples and a high thrust density, making it a suitable choice for many high precision applications. The normal forces of attraction are also very low.

Additionally, FSLSMs of the subject invention can also be suitable for short-stroke applications when the excitation sources are mounted in the stator. This can be useful in many applications, including, but not limited to, linear generators, plungers, refrigerant compressors, and elevator doors.

FSLSMs of the subject invention are advantageous in several applications, including, but not limited to, ropeless elevators, conveyors, transportation, power generation (tidal or wave generator), Electromagnetic Aircraft Launching Systems (EMALS), pick and place applications, sliding doors, and remote operated valves, maglevs and trams, roller coasters, robotics and material handling, textile machinery, food processing and packaging machinery, aircraft flaps, aircraft valves, other aircraft controls, CNC and other machining applications, replacing hydraulics in marine ships, weapons loading, weapons positioning, and other weapons applications.

EXEMPLIFIED EMBODIMENTS

The invention includes, but is not limited to, the following embodiments:

Embodiment 1

A flux-switching linear synchronous motor (FSLSM), comprising:
at least two permanent magnets;
a coil wrapped around each permanent magnet; and
at least one stator,
wherein all permanent magnets of the FSLSM are magnetized in the same direction.

Embodiment 2

The FSLSM according to embodiment 1, comprising two stators, wherein a first stator is disposed below the permanent magnets and a second stator is disposed above the permanent magnets.

Embodiment 3

The FSLSM according to embodiment 2, wherein each stator comprises stator teeth and teeth gaps between the stator teeth, wherein the first stator and the second stator are displaced from each other by half a pole pitch such that the stator teeth of the first stator are aligned with the teeth gaps of the second stator and the stator teeth of the second stator are aligned with the teeth gaps of the first stator.

Embodiment 4

The FSLSM according to any of embodiments 1-3, wherein the FSLSM is yokeless.

Embodiment 5

The FSLSM according to any of embodiments 1-4, comprising at least six permanent magnets

Embodiment 6

The FSLSM according to any of embodiments 1-5, wherein the FSLSM is a three-phase FSLSM.

Embodiment 7

The FSLSM according to any of embodiments 1-6, comprising six slots and ten poles.

Embodiment 8

The FSLSM according to any of embodiments 1-4, 6 or 7, comprising at least five permanent magnets

Embodiment 9

The FSLSM according to any of embodiments 1-5, 7, or 8, wherein the FSLSM is a five-phase FSLSM.

Embodiment 10

The FSLSM according to any of embodiments 1-9, wherein all permanent magnets and all coils are encapsulated in a non-magnetic encapsulating material, thereby forming a one-piece translator containing all permanent magnets and all coils of the FSLSM.

Embodiment 11

The FSLSM according to embodiment 10, wherein the non-magnetic encapsulating material comprises a thermally-conducting resin.

Embodiment 12

The FSLSM according to any of embodiments 10-11, wherein the non-magnetic encapsulating material comprises aluminum.

Embodiment 13

The FSLSM according to any of embodiments 1-12, wherein each permanent magnet comprises NdFeB.

Embodiment 14

The FSLSM according to any of embodiments 1-13, wherein the at least one stator comprises steel.

Embodiment 15

The FSLSM according to any of embodiments 1-14, wherein a split ratio of the FSLSM is from about 0.27 to about 0.32.

Embodiment 16

The FSLSM according to any of embodiments 1-15, wherein a stator tooth width ratio of the FSLSM is from about 0.34 to about 0.35.

Embodiment 17

The FSLSM according to any of embodiments 1-16, wherein a stator tooth height ratio of the FSLSM is from about 0.37 to about 0.40.

Embodiment 18

The FSLSM according to any of embodiments 1-17, wherein a translator tooth width ratio of the FSLSM is from about 0.20 to about 0.22.

Embodiment 19

The FSLSM according to any of embodiments 1-18; wherein a pole pitch of the FSLSM is from 20 mm to 30 mm.

Embodiment 20

The FSLSM according to any of embodiments 1-19, wherein a width of each permanent magnet is from 2.5 mm to 3 mm.

Embodiment 21

The FSLSM according to any of embodiments 1-20, wherein a height of each permanent magnet is from 30 mm to 40 mm.

Embodiment 22

The FSLSM according to any of embodiments 1-21, wherein a permanent magnet pole pitch is from 35 mm to 45 mm.

Embodiment 23

The FSLSM according to any of embodiments 1-22, wherein an air gap is from 0.9 mm to 1.1 mm.

Embodiment 24

The FSLSM according to any of embodiments 1-23, wherein a width of each stator tooth of the at least one stator is from 8 mm to 9 mm.

Embodiment 25

The FSLSM according to any of embodiments 1-24, wherein a height of each stator tooth of the at least one stator is from 10 mm to 12 mm.

Embodiment 26

The FSLSM according to any of embodiments 1-25, wherein a translator tooth width of the FSLSM is from 18 mm to 20 mm.

Embodiment 27

The FSLSM according to any of embodiments 1-26, wherein a magnet residual flux density of the FSLSM is from 1 T to 1.5 T.

Embodiment 28

The FSLSM according to any of embodiments 1-27, wherein a machine depth of the FSLSM is from 80 mm to 120 mm.

Embodiment 29

The FSLSM according to any of embodiments 1-28, wherein a translator length of the FSLSM is from 220 mm to 260 mm.

Embodiment 30

A method of manufacturing an FSLSM, comprising:
providing at least two permanent magnets;
providing a coil wound around each permanent magnet; and
providing the permanent magnets having coils wound around them on a first stator,
wherein all permanent magnets of the FSLSM are magnetized in the same direction.

Embodiment 31

The method according to embodiment 30, further comprising providing a second stator on the permanent magnets having coils wound around them,
wherein the first stator and the second stator each comprises stator teeth and teeth gaps between the stator teeth, and
wherein the second stator is provided such that it is displaced from the first stator by half a pole pitch such that the stator teeth of the first stator are aligned with the teeth gaps of the second stator and the stator teeth of the second stator are aligned with the teeth gaps of the first stator.

Embodiment 32

The method according to any of embodiments 30-31, further comprising:
encapsulating the permanent magnets and the coils in a non-magnetic encapsulating material, prior to providing the permanent magnets having coils wound around them on the first stator, thereby forming a one-piece translator containing all permanent magnets and all coils of the FSLSM, wherein providing the permanent magnets having coils wound around them on the first stator comprises providing the one-piece translator on the first stator.

Embodiment 33

The method according to any of embodiments 30-32, further comprising magnetizing the permanent magnets such that all permanent magnets of the FSLSM are magnetized in the same direction, wherein magnetizing the permanent magnets is performed after providing the permanent magnets having coils wound around them on the first stator.

Embodiment 34

The method according to embodiment 32, further comprising magnetizing the permanent magnets such that all permanent magnets of the FSLSM are magnetized in the same direction, wherein magnetizing the permanent magnets is performed after the one-piece translator is formed.

Embodiment 35

The method according to any of embodiments 30-34, wherein the FSLSM is yokeless.

Embodiment 36

The method according to any of embodiments 30-35, wherein the FSLSM comprises at least six permanent magnets

Embodiment 37

The method according to any of embodiments 30-36, wherein the FSLSM is a three-phase FSLSM.

Embodiment 38

The method according to any of embodiments 30-37, wherein the FSLSM comprises six slots and ten poles.

Embodiment 39

The method according to any of embodiments 30-35, 37, or 38, wherein the FSLSM comprises at least five permanent magnets

Embodiment 40

The method according to any of embodiments 30-36, 38, or 39, wherein the FSLSM is a five-phase FSLSM.

Embodiment 41

The method according to any of embodiments 32-40, wherein the non-magnetic encapsulating material comprises a thermally-conducting resin.

Embodiment 42

The method according to any of embodiments 32-41, wherein the non-magnetic encapsulating material comprises aluminum.

Embodiment 43

The method according to any of embodiments 30-42, wherein each permanent magnet comprises NdFeB.

Embodiment 44

The method according to any of embodiments 30-43, wherein the each stator comprises steel.

Embodiment 45

The method according to any of embodiments 30-44, wherein a split ratio of the FSLSM is from about 0.27 to about 0.32.

Embodiment 46

The method according to any of embodiments 30-45, wherein a stator tooth width ratio of the FSLSM is from about 0.34 to about 0.35.

Embodiment 47

The method according to any of embodiments 30-46, wherein a stator tooth height ratio of the FSLSM is from about 0.37 to about 0.40.

Embodiment 48

The method according to any of embodiments 30-47, wherein a translator tooth width ratio of the FSLSM is from about 0.20 to about 0.22.

Embodiment 49

The method according to any of embodiments 30-48, wherein a pole pitch of the FSLSM is from 20 mm to 30 mm.

Embodiment 50

The method according to any of embodiments 30-49, wherein a width of each permanent magnet is from 2.5 mm to 3 mm.

Embodiment 51

The method according to any of embodiments 30-50, wherein a height of each permanent magnet is from 30 mm to 40 mm.

Embodiment 52

The method according to any of embodiments 30-51, wherein a permanent magnet pole pitch is from 35 mm to 45 mm.

Embodiment 53

The method according to any of embodiments 30-52, wherein an air gap is from 0.9 mm to 1.1 mm.

Embodiment 54

The method according to any of embodiments 30-53, wherein a width of each stator tooth of the at least one stator is from 8 mm to 9 mm.

Embodiment 55

The method according to any of embodiments 30-54, wherein a height of each stator tooth of the at least one stator is from 10 mm to 12 mm.

Embodiment 56

The method according to any of embodiments 30-55, wherein a translator tooth width of the FSLSM is from 18 mm to 20 mm.

Embodiment 57

The method according to any of embodiments 30-56, wherein a magnet residual flux density of the FSLSM is from 1 T to 1.5 T.

Embodiment 58

The method according to any of embodiments 30-57, wherein a machine depth of the FSLSM is from 80 mm to 120 mm.

Embodiment 59

The method according to any of embodiments 30-58, wherein a translator length of the FSLSM is from 220 mm to 260 mm.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

An FSLSM according to an embodiment of the subject invention was compared to an existing FSLSM. The FSLSM of the subject invention used for comparison was a 3-phase, 6-slot/10-pole motor having six PMs. A cross-sectional diagram of the FSLSM of the subject invention is shown in FIG. 2.

The existing FSLSM used for comparison was a 3-phase, 6-slot/13-pole motor, and is shown in FIG. 1. Both the existing FSLSM and the FSLSM of the subject invention had the same electrical loading, magnetic material, core material, volume of magnets, and volume of active steel in order to allow for a fair comparison. However, in the FSLSM of the subject invention, a double-sided topology was used and all magnets were magnetized in the same direction, whereas in the existing design, the magnets in adjacent teeth were oppositely magnetized. Both motors had concentrated windings.

Parameters of the two FSLSM designs are shown in Table A. The parameters for the FSLSM of the subject invention are under the heading "Proposed", while the parameters for the existing FSLSM are under the heading "Conventional". The two stators of the FSLSM of the subject invention were displaced by half a pole-pitch in order to maintain symmetry for flux flow. Open-circuit flux lines of the existing FSLSM are shown in FIG. 5, and open-circuit flux lines of the FSLSM according to an embodiment of the subject invention are shown in FIG. 6. The FSLSM according to an embodiment of the subject invention utilizes the width of winding slots to focus the flux through stator teeth.

Due to their complex geometry and non-linearity, analytical models of flux-switching machines can be difficult to obtain. Hence, the existing FSLSM and FSLSM according to an embodiment of the subject invention were analyzed using finite-element (FE) methods.

Figure 9:
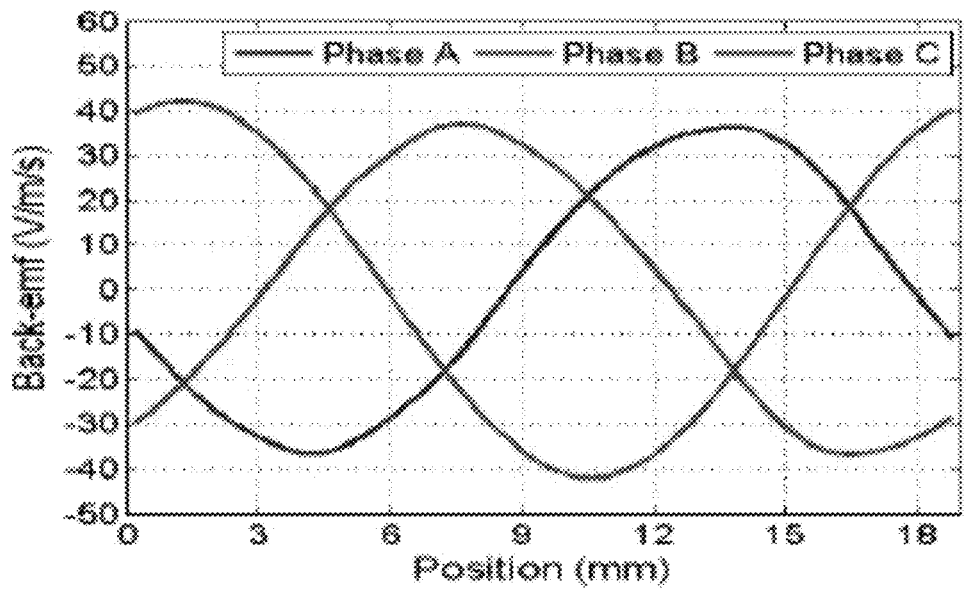
FIG. 9 is a plot showing back-emf as a function of mechanical position for an existing motor.
Figure 10:
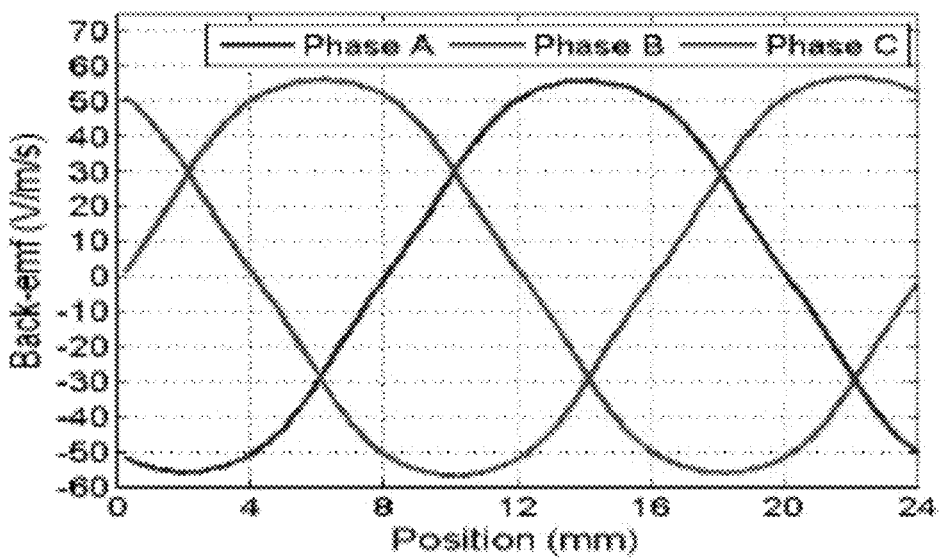
FIG. 10 is a plot showing back-emf as a function of mechanical position for a motor according to an embodiment of the subject invention.

Normalized back-emfs obtained from the two motors are shown in FIGS. 9 (existing FSLSM) and 10 (FSLSM according to an embodiment of the subject invention). Referring to FIG. 10, all three phases have almost the same back-emf amplitude. However, referring to FIG. 9, in the existing motor, end-phases have lower amplitude of back-emf when compared to the middle phase. Also, the amplitude of the back-emfs is higher in the FSLSM according to an embodiment of the subject invention, even though the total volume of PMs is the same.

TABLE A

Design Specifications for Comparison

| Parameter | Symbol | Conventional | Proposed |
|---|---|---|---|
| Mover length | L | 240 mm | 240 mm |
| Pole pitch | $\tau_p$ | 18.46 mm | 24 mm |
| PM width | $w_m$ | 2.12 mm | 2.74 mm |
| PM height | $h_m$ | 45.3 mm | 35 mm |
| Airgap | $l_g$ | 1 mm | 1 mm |
| Tooth width | $w_{st}$ | 7 mm | 8 mm |
| Tooth height | $h_t$ | 5 mm | 5 mm |
| Mover tooth width | $w_{mt}$ | 24 mm | 24 mm |
| PM residual flux density | $B_r$ | 1.15 T | 1.15 T |

Figure 11:
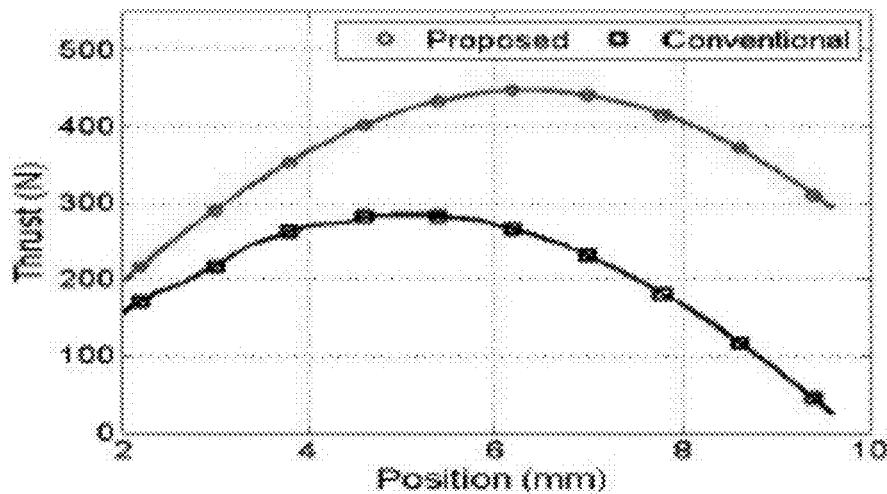
FIG. 11 is a plot showing thrust as a function of mechanical position.
Figure 12:
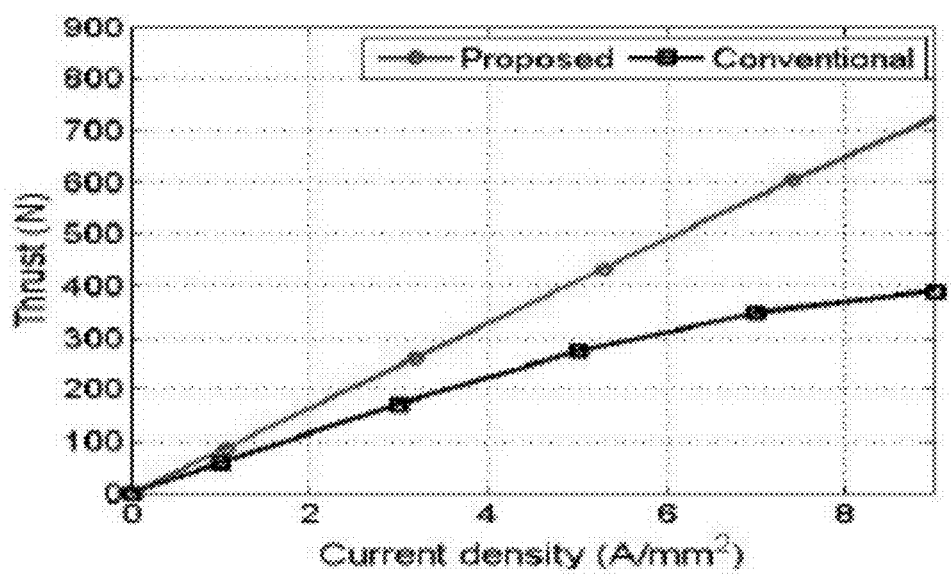
FIG. 12 is a plot showing thrust as a function of current density.

Both the existing FSLSM and the FSLSM according to an embodiment of the subject invention were fed by the same sinusoidal source of current with a peak amplitude of 5 A under normal conditions. FIG. 11 shows the thrust-position (similar to torque-angle) curve of the two FSLSMs. The line for the FSLSM of the subject invention is labeled "Proposed", and the line for the existing FSLSM is labeled "Conventional". For the same electrical loading, the maximum thrust obtained from the FSLSM of the subject invention is 56% higher than that of the existing FSLSM. Average thrusts for different input current amplitudes are shown in FIG. 12. Again, the line for the FSLSM of the subject invention is labeled "Proposed", and the line for the existing FSLSM is labeled "Conventional". The FSLSM of the subject invention has excellent linearity even under very high currents but the existing FSLSM begins saturating at a lower current level. This difference could be due in part to the fact that the mover in the FSLSM of the subject invention is yokeless, i.e., no yoke (e.g., back-iron) is present.

Figure 13:
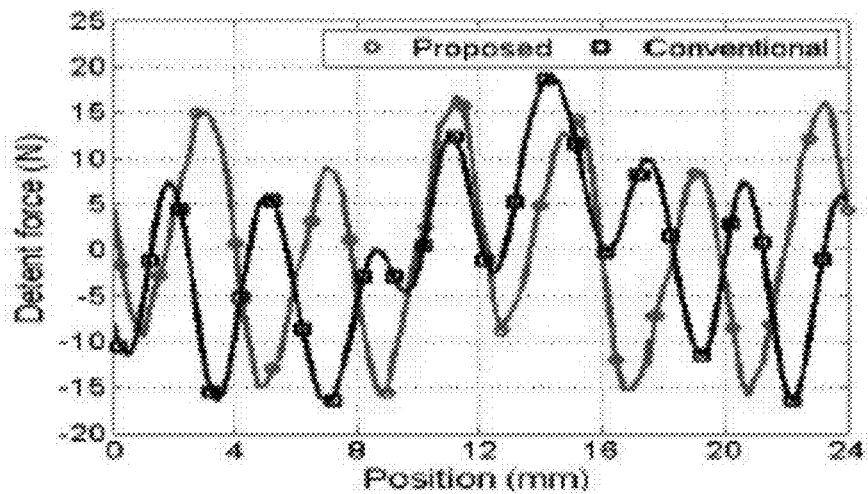
FIG. 13 is a plot showing force as a function of mechanical position.
Figure 14:
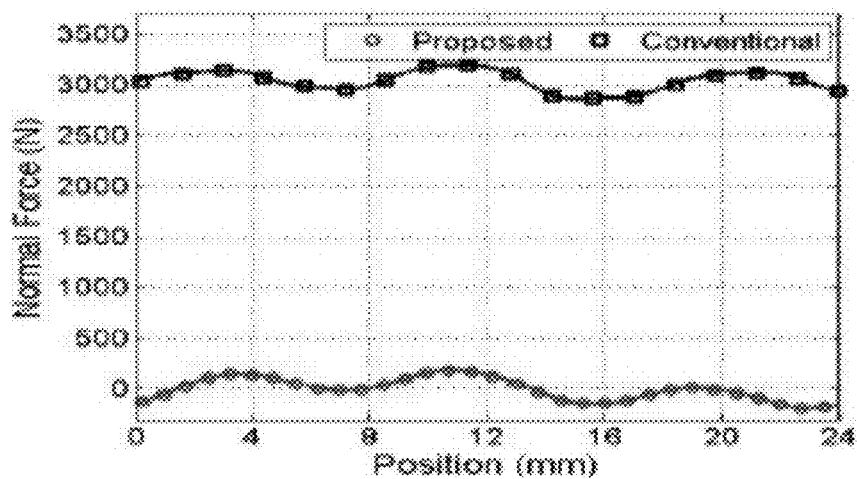
FIG. 14 is a plot showing force as a function of mechanical position.

Referring to FIG. 13, the peak-to-peak amplitude of cogging (detent) force is similar in both designs at about 12.5% of the rated thrust in the existing FSLSM and about 8% in the FSLSM of the subject invention. Due to the double-sided structure of the FSLSM of the subject invention, the average normal force on the mover is zero or very close to zero. However, referring to FIG. 14, oscillations can be present due to saliency. Single-sided PM linear motors require strong linear bearings to withstand the very high normal forces (e.g., ~3000 N).

Figure 61:
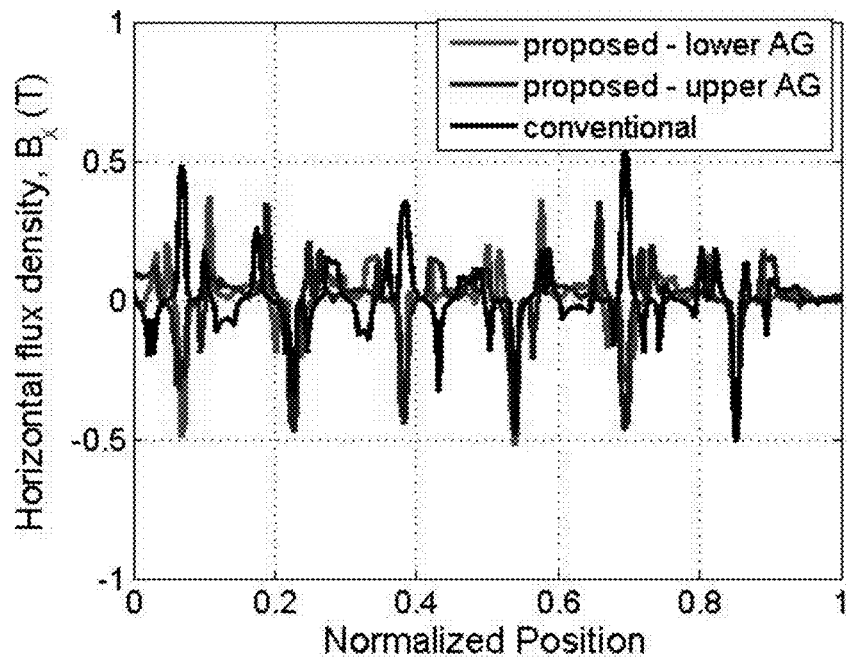
FIG. 61 shows a plot of horizontal flux density as a function of normalized position.
Figure 62:
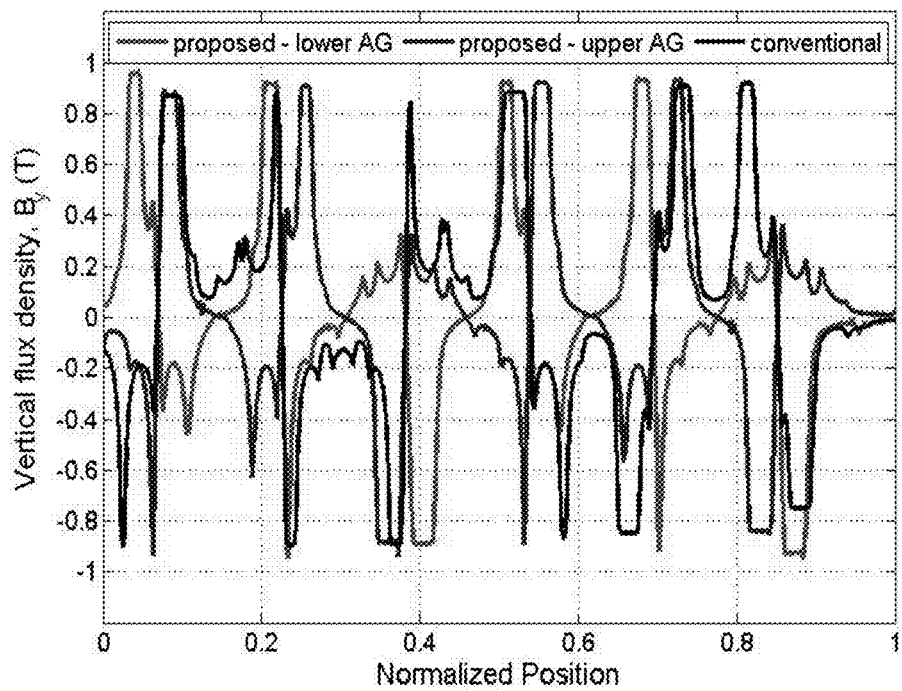
FIG. 62 shows a plot of vertical flux density as a function of normalized position.

FIGS. 61 and 62 show the horizontal flux density and vertical flux density, respectively, as a function of normalized mechanical position, for an existing FSLSM (labeled "Conventional") and the lower air gap (AG) and upper AG of an FSLSM of the subject invention (labeled "Proposed").

Example 2

An FSLSM according to an embodiment of the subject invention was compared to an existing FSLSM. The FSLSM of the subject invention used for comparison was a 3-phase, 6-slot/10-pole motor having six PMs. A cross-sectional diagram of the FSLSM of the subject invention is shown in FIG. 2.

Figure 3:
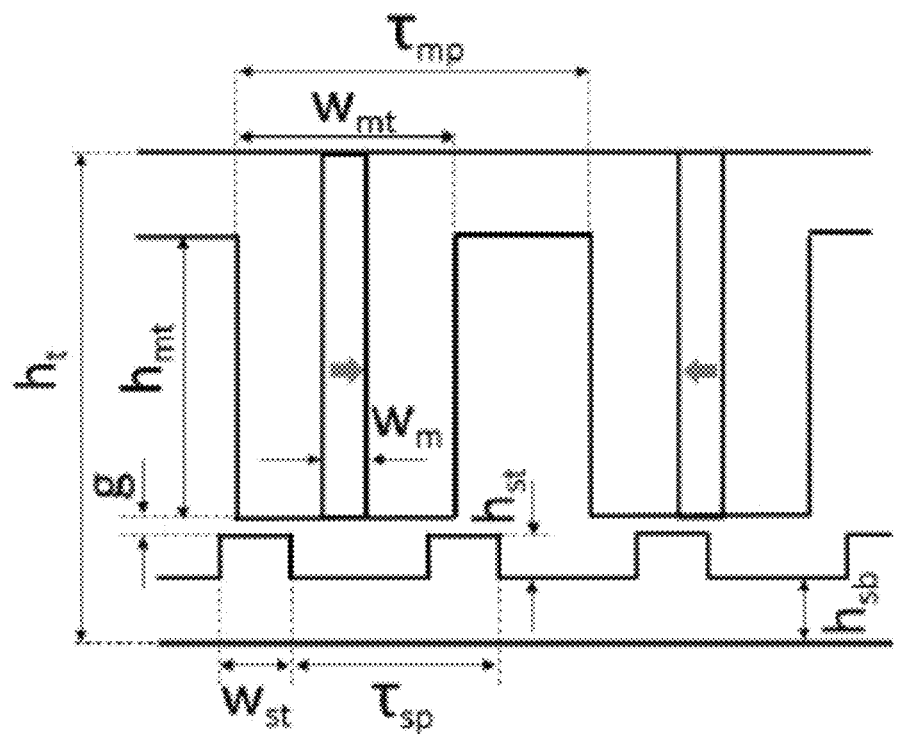
FIG. 3 is a cross-sectional diagram of an existing motor.

The existing FSLSM used for comparison was a 3-phase, 6-slot/13-pole motor, and is shown in FIG. 1. Both the existing FSLSM and the FSLSM of the subject invention had the same electrical loading, magnetic material, core material, volume of magnets, and volume of active steel in order to allow for a fair comparison. However, in the FSLSM of the subject invention, a double-sided topology was used and all magnets were magnetized in same direction, whereas in the existing design, the magnets in adjacent teeth were oppositely magnetized. Strong NdFeB magnets were used as the PMs. Laminated carbon steel 1010 was used as the material for both the stator (and the translator in the simulations). Parameters of the two FSLSM designs are shown in Table B. The parameters for the FSLSM of the subject invention are under the heading "Proposed", while the parameters for the existing FSLSM are under the heading "Conventional". Parameters are also shown in FIG. 3 (existing FSLSM) and FIG. 4 (FSLSM of the subject invention). In the FSLSM of the subject invention, an air gap (AG) is present on either side of the translator, making the effective AG twice that of the existing FSLSM. The two stators of the FSLSM of the subject invention were displaced by half a pole-pitch in order to maintain symmetry for flux flow. Open-circuit flux lines of the existing FSLSM are shown in FIG. 5, and open-circuit flux lines of the FSLSM according to an embodiment of the subject invention are shown in FIG. 6. In the FSLSM of the subject invention, the flux was forced through stator teeth due to the presence of slots.

TABLE B

Design Specifications for Comparison

| Parameter | Symbol | Conventional | Proposed |
|---|---|---|---|
| Pole pitch | $\tau_{sp}$ | 18.46 mm | 24 mm |
| PM width | $w_m$ | 2.12 mm | 27.4 mm |
| PM height | $h_m$ | 45.3 mm | 35 mm |
| PM pole pitch | $\tau_{mp}$ | 40 mm | 40 mm |
| Airgap | g | 1 mm | 1 mm |
| Stator tooth width | $w_{st}$ | 7 mm | 8 mm |
| Stator tooth height | $h_{st}$ | 5 mm | 5 mm |
| Translator tooth width | $w_{mt}$ | 24 mm | 24 mm |
| PM residual flux density | $B_r$ | 1.15 T | 1.15 T |
| Machine depth | D | 100 mm | 100 mm |
| Translator length | L | 240 mm | 240 mm |
| Active machine volume | $vol_a$ | 1.52 cm³ | 1.61 cm³ |
| Mass of active part of machine (excluding resin mass) | $M_a$ | 10.47 kg | 10.31 kg |
| Mass of Translator (excluding resin mass) | $M_m$ | 7.87 kg | 5.94 kg |
| Rated output power | $P_o$ | 280 W | 430 W |
| Input phase voltage rms | $V_{in}$ | 163 V | 71 V |
| Power factor | pf | 0.168 | 0.6 |

Due to their complex geometry and non-linearity, analytical models of flux-switching machines can be difficult to obtain. Hence, the existing FSLSM and FSLSM according to an embodiment of the subject invention were analyzed using FE methods. The results of the FE analysis were obtained using the software package Ansoft Maxwell 2D.

Normalized back-emfs obtained from the two motors are shown in FIGS. 9 (existing FSLSM) and 10 (FSLSM according to an embodiment of the subject invention). Referring to FIG. 10, all three phases have almost the same back-emf amplitude. However, referring to FIG. 9, in the existing motor, end-phases have lower amplitude of back-emf when compared to the middle phase. Also, the amplitude of the back-emfs is higher in the FSLSM according to an embodiment of the subject invention, even though the total volume of PMs is the same.

Both the existing FSLSM and the FSLSM according to an embodiment of the subject invention were fed by the same sinusoidal source of current with a current density of 5.3 A/mm² under normal conditions. FIG. 11 shows the thrust-position (similar to torque-angle) curve of the two FSLSMs. The line for the FSLSM of the subject invention is labeled "Proposed", and the line for the existing FSLSM is labeled "Conventional". For the same current density, the maximum thrust obtained from the FSLSM of the subject invention is 56% higher than that of the existing FSLSM. Average thrusts for different input current amplitudes are shown in FIG. 12. Again, the line for the FSLSM of the subject invention is labeled "Proposed", and the line for the existing FSLSM is labeled "Conventional". The FSLSM of the subject invention has excellent linearity even under very high currents but the existing FSLSM begins saturating at a lower current level. This difference could be due in part to the fact that the mover in the FSLSM of the subject invention is yokeless, i.e., no yoke (e.g., back-iron) is present. Due to its topology, the flux from the magnets is better utilized in the FSLSM of the subject invention. This leads to an increased back-emf, which is at least partly responsible for the increase in thrust. Consequently, the voltage applied at the input of the winding also increases by the same amount. Thus, the input power of the FSLSM of the subject invention is also higher. However, the thrust of the existing FSLSM cannot be increased by increasing the input power because the machine begins to saturate.

Referring to FIG. 13, the peak-to-peak amplitude of cogging (detent) force is similar in both designs at about 12.5% of the rated thrust in the existing FSLSM and about 8% in the FSLSM of the subject invention. Due to the double-sided structure of the FSLSM of the subject invention, average normal force on the mover is zero or very close to zero. However, referring to FIG. 14, oscillations can be present due to saliency. Single-sided PM linear motors require strong linear bearings to withstand the very high normal forces.

Figure 15:
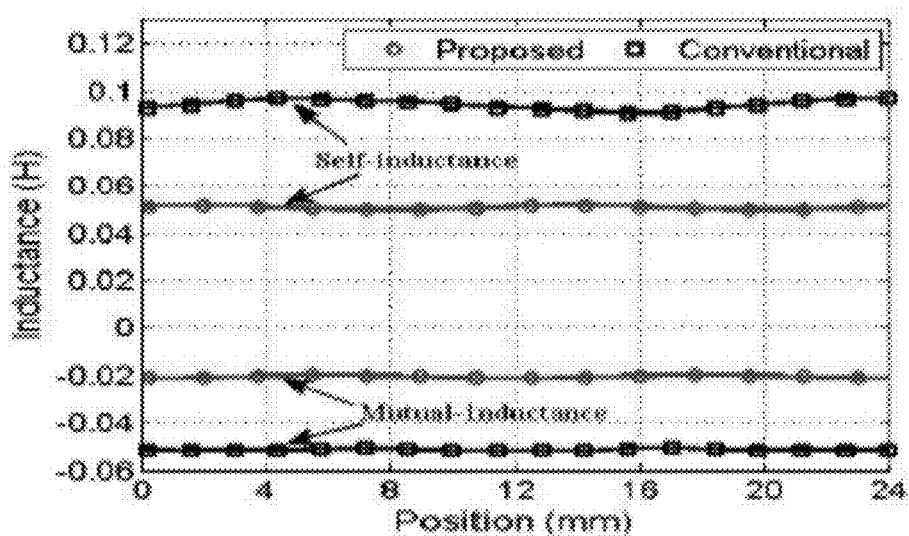
FIG. 15 is a plot showing inductance as a function of mechanical position.
Figure 16:
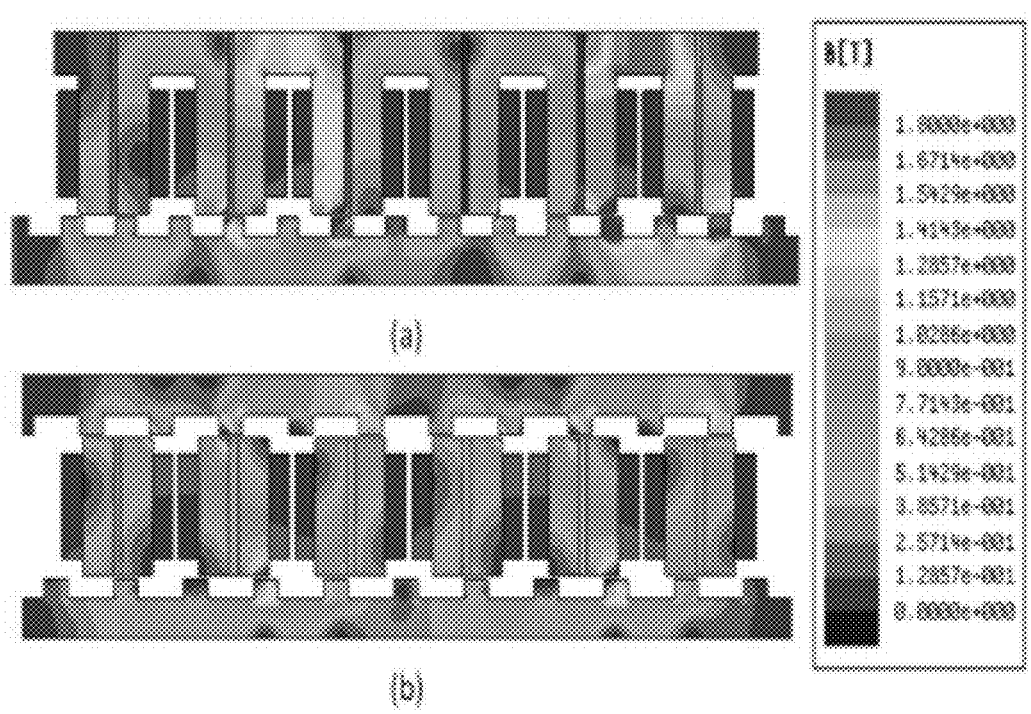
FIG. 16a is a cross-sectional diagram showing magnitude of flux density for an existing motor.
FIG. 16b is a cross-sectional diagram showing magnitude of flux density for a motor according to an embodiment of the subject invention.

FIG. 12 shows average thrusts for different current densities. The FSLSM of the subject invention has excellent linearity even under very high currents but the existing FSLSM begins saturating at a lower current level. The yokeless translator in the proposed design ensures that the steel is better utilized. FIG. 16 shows plots of the magnitude of flux density for an input current density of 7.4 A/mm² for the existing FSLSM (FIG. 16a) and the FSLSM of the subject invention (FIG. 16b). In the existing FSLSM, one of the stator teeth is already completely saturated. In FIGS. 16a and 16b, the translators of each motor are positioned such that the worst-case saturation is seen. FIG. 15 shows inductances, both self and mutual, of the FSLSM of the subject invention and the existing FSLSM. The inductance of the FSLSM of the subject invention is almost half of that of the existing FSLSM. This is due at least in part to the fact that the AG in the FSLSM of the subject invention is twice that of the existing FSLSM. This significantly improves the power factor of the FSLSM of the subject invention.

Figure 17:
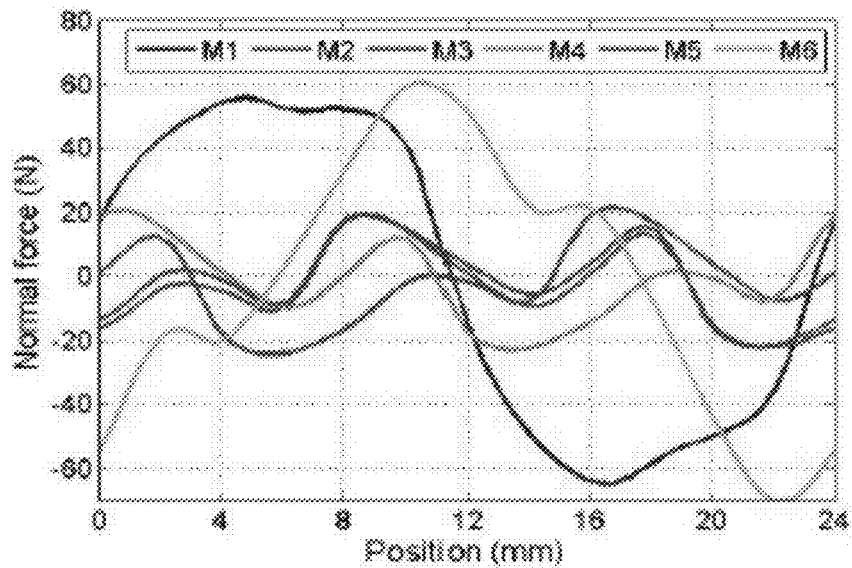
FIG. 17 is a plot showing normal force as a function of mechanical position for a motor according to an embodiment of the subject invention.
Figure 18:
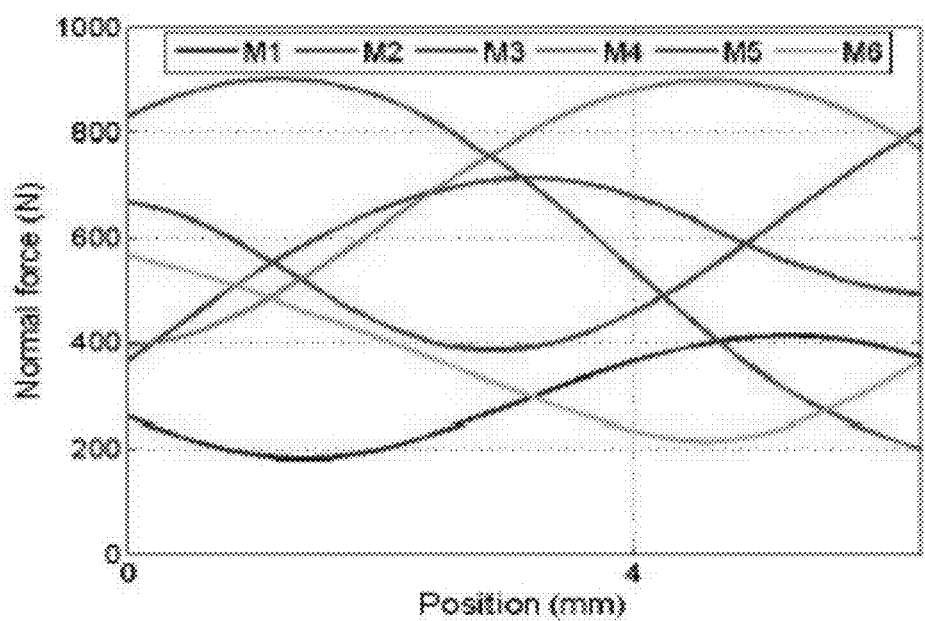
FIG. 18 is a plot showing normal force as a function of mechanical position for an existing motor.

The normal forces on the translator modules were analyzed using FE analysis. FIG. 17 and FIG. 18 show the normal forces on each phase module of the FSLSM of the subject invention and existing FSLSM, respectively. The individual forces on the translator segments are low in the FSLSM of the subject invention when compared to those of the existing FSLSM. This is due at least in part to the double-sided symmetry that the FSLSM of the subject invention possesses. Also, the modules at the end of the translator experience more normal force when compared to the other modules. This end effect is prevalent in both the FSLSM of the subject invention and the existing FSLSM.

Figure 19:
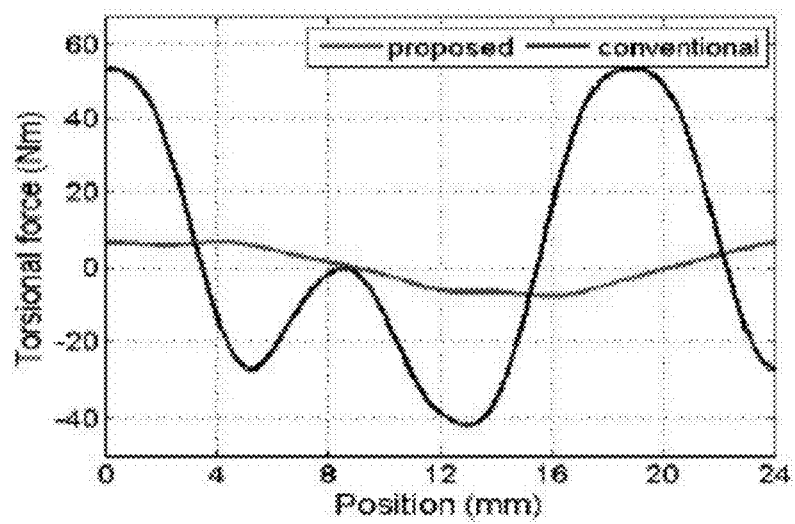
FIG. 19 is a plot showing torsional force as a function of mechanical position.

FIG. 19 shows torsional force about the center of the translator in the y-axis direction as a function of position. Referring to FIG. 19, the torsional torque about the center of the translator in the y-axis direction is much lower in the FSLSM of the subject invention compared to the existing FSLSM. This leads to less stress on the linear bearings.

Example 3

Figure 24:
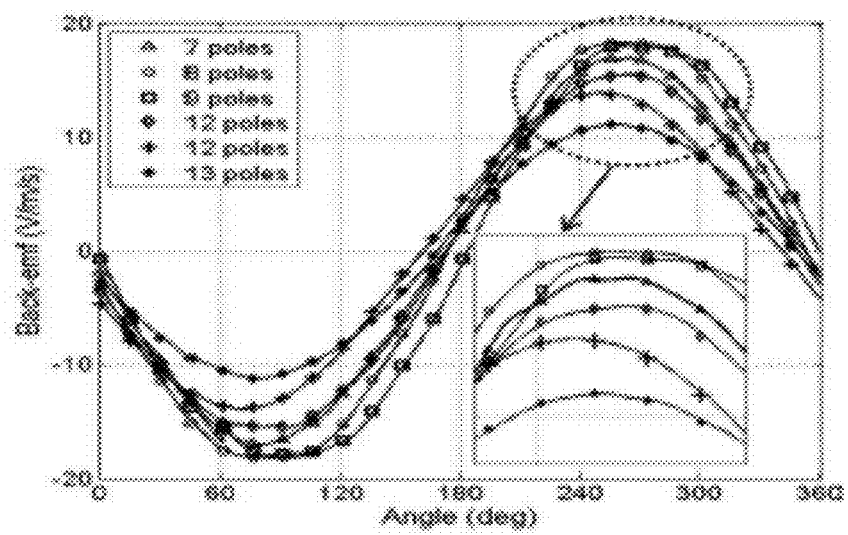
FIG. 24 is a plot showing back-emf as a function of electrical angle.

A yokeless five-phase FSLSM with the topology shown in FIGS. 21 and 22 was analyzed and optimized. Initial parameters of the FSLSM before optimization are shown in Table C. The two stators of the proposed motor were displaced by half a pole-pitch in order to maintain symmetry for flux flow. Open-circuit flux lines of the FSLSM are shown in FIG. 23. The FSLSM utilizes the width of winding slots to focus the flux through stator teeth. Strong NdFeB magnets were used as the PMs. Laminated carbon steel 1010 was used as the material for the stators (and the translator in the simulations). Feasible slot-pole combinations of an FSLSM can be obtained from the following equation, $$N_p = N_s\left(2 \pm \frac{n}{2q}\right)$$

where, q is the number of phases, $N_s$ is number of slots, $N_p$ is the number of stator poles, and n is any natural number. Different n values were chosen such that $N_p$ was an integer. For each configuration, the corresponding phase A back-emf was obtained and is shown in FIG. 24. Number of slots ($N_s$) was kept at a minimum of 5 as this ensures that a low number of PMs were used. It is seen that the back-emf amplitude was highest for $N_p$=8. Hence, the 5-slot/8-pole configuration was used for analysis and optimization. As the proposed FSLSM was doubly-salient and highly nonlinear, closed-form solutions or other analytical models were very difficult to obtain, so FE methods were used for analysis.

TABLE C

Design Specifications for Five-Phase FSLSM of Example 3

| Parameter | Symbol | Proposed |
| --- | --- | --- |
| Pole pitch | $\tau_{sp}$ | 25 mm |
| PM width | $w_m$ | 3.29 mm |
| PM height | $h_m$ | 35 mm |
| Airgap | g | 1 mm |
| Stator tooth width | $w_{st}$ | 8 mm |
| Stator tooth height | $h_{st}$ | 5 mm |
| Translator tooth width | $w_{mt}$ | 24 mm |
| PM residual flux density | $B_r$ | 1.15 T |
| Machine depth | D | 60 mm |
| Translator length | L | 200 mm |

Example 4

Figure 25:
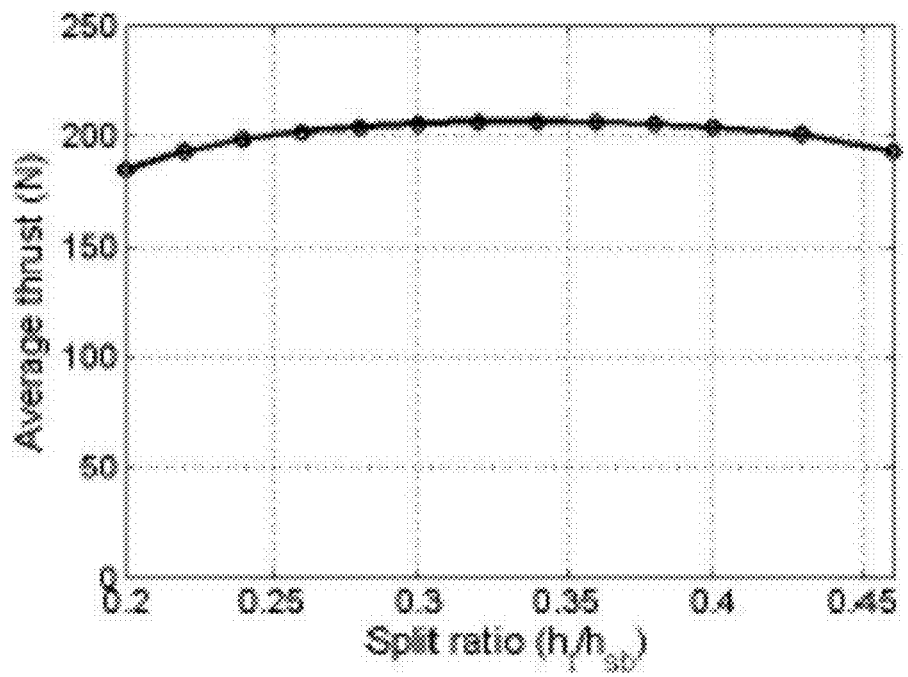
FIG. 25 is a plot showing thrust as a function of split ratio.

The five-phase FSLSM of Example 3 was optimized to obtain maximum average thrust using individual parameter optimization. The electrical loading, overall volume of the machine, and magnet volume were kept constant during the optimization procedure. Then, the results of the individual parameter optimization were compared with a global optimization technique based on genetic algorithm (GA). Design variables for the optimization, their initial values, and constraints are shown in Table D. The order in which the variables are listed is the order in which the optimization was performed. However, as it is an individual parameter optimization, at every step only one design variable was varied while the others were kept constant. The optimized value of the design parameter was then carried on to the next step of the optimization. FIG. 25 shows the variation of average thrust with the split ratio of the FSLSM. While the split ratio was varied, the back-iron thickness (hsb) was assumed to be equal to the stator tooth height (hst). The optimized value of the split ratio was 0.3 to 0.35.

Figure 26:
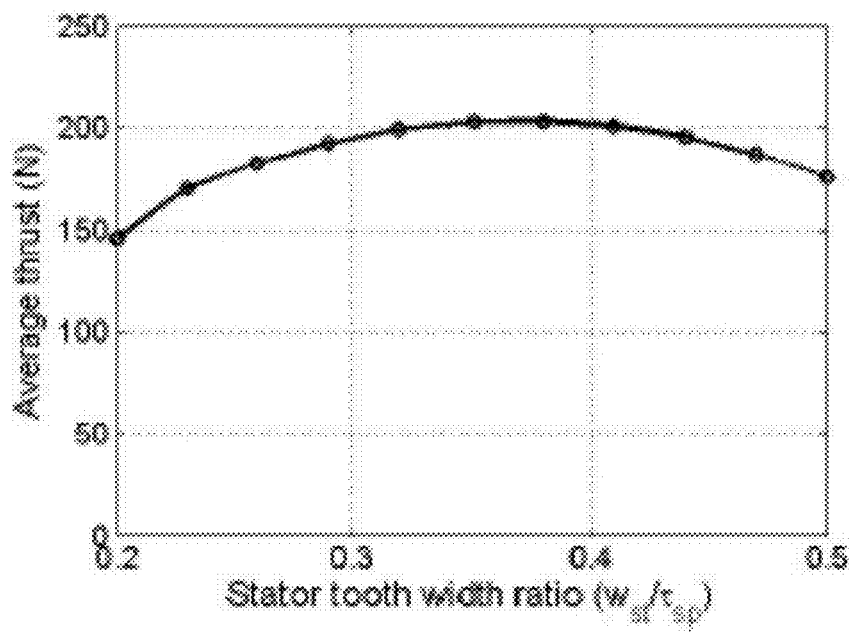
FIG. 26 is a plot showing thrust as a function of stator tooth width ratio.
Figure 27:
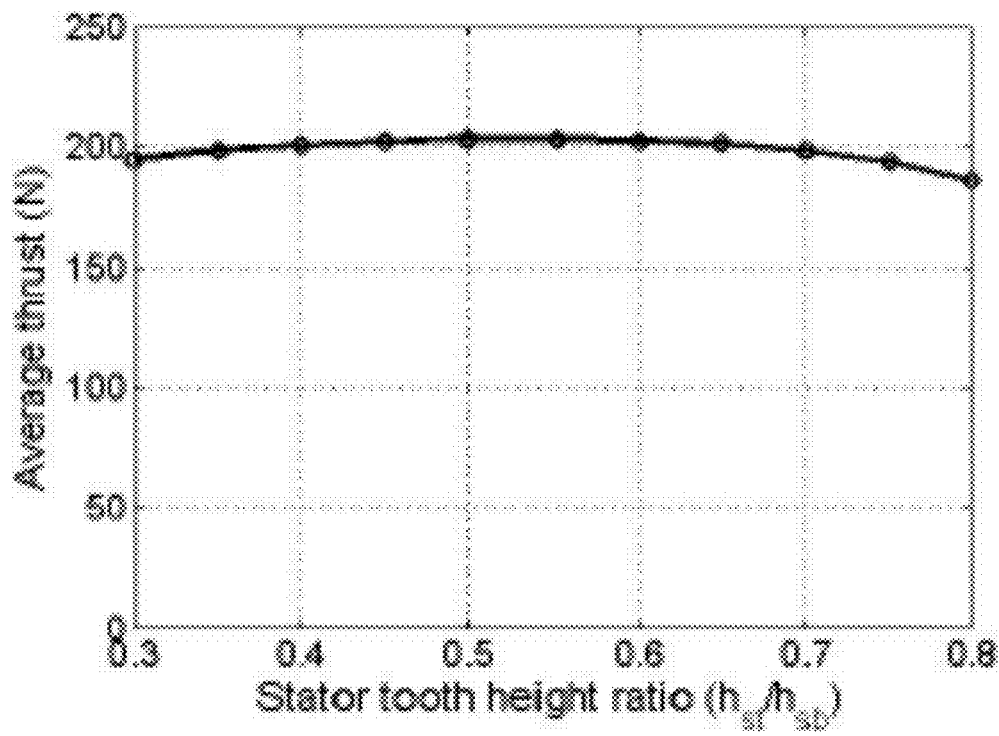
FIG. 27 is a plot showing thrust as a function of stator tooth height ratio.
Figure 28:
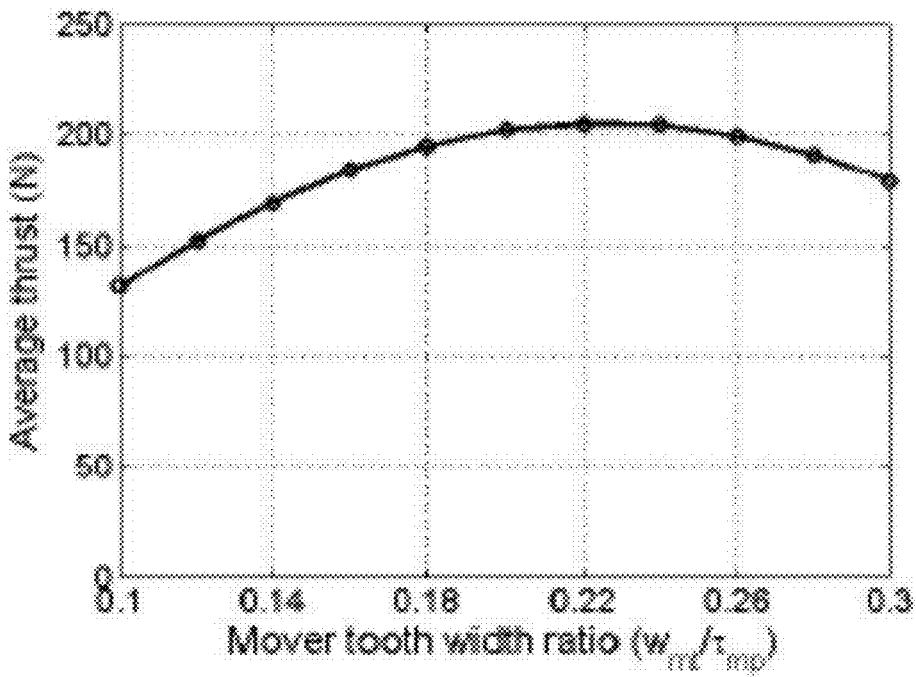
FIG. 28 is a plot showing thrust as a function of translator tooth width ratio.
Figure 29:
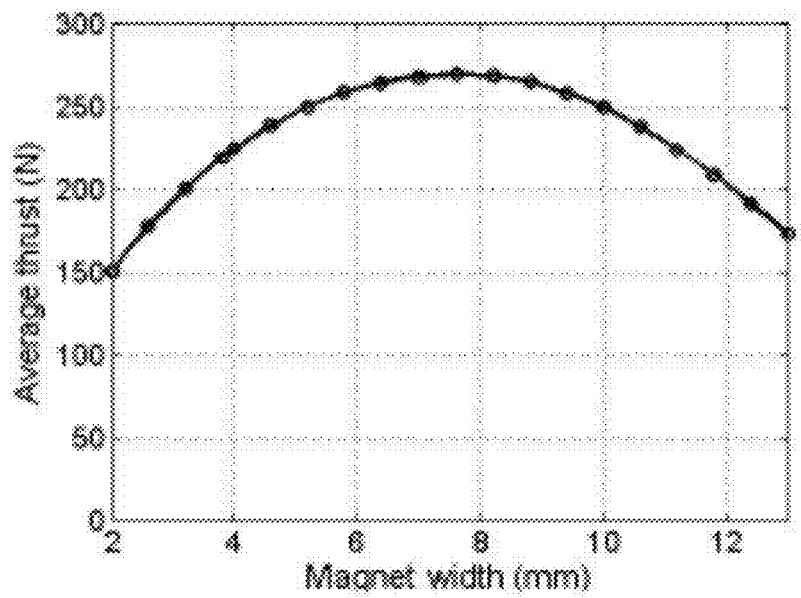
FIG. 29 is a plot showing thrust as a function of magnet width.
Figure 30:
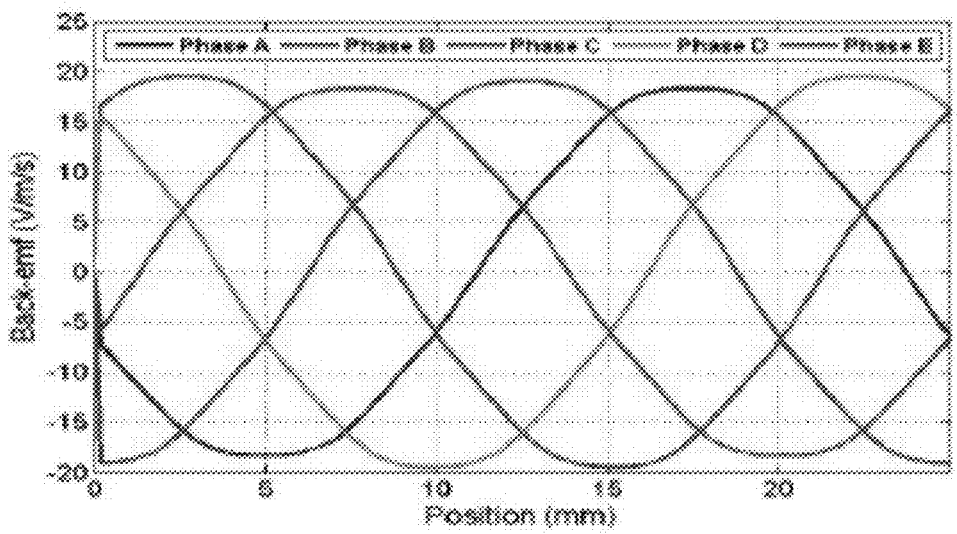
FIG. 30 is a plot showing back-emf as a function of position.
Figure 31:
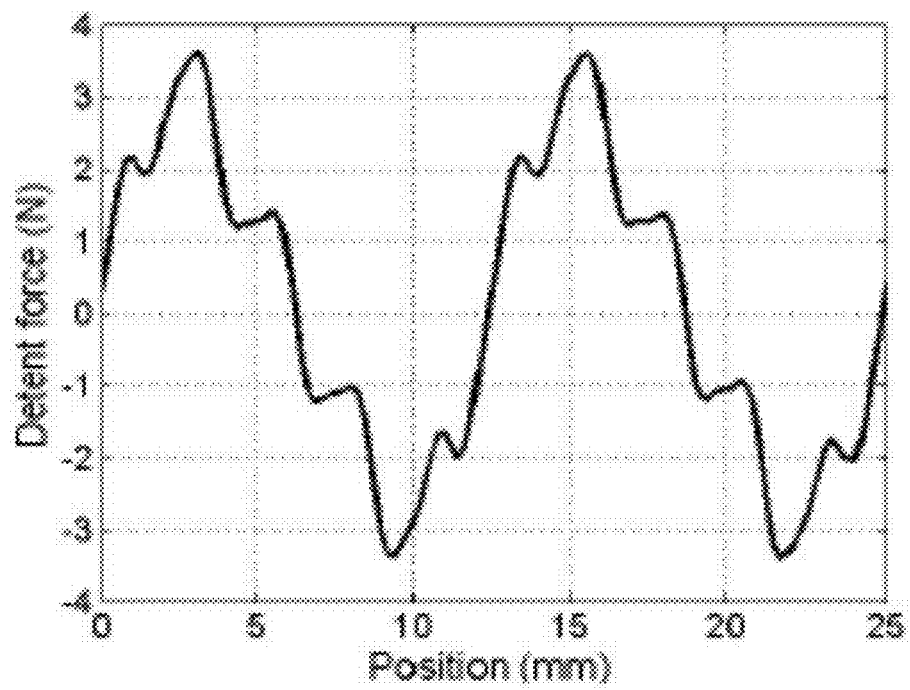
FIG. 31 is a plot showing force as a function of mechanical position.

FIG. 26 shows the variation of the average thrust with the stator tooth width ratio, and the optimal value was found in the range of 0.35 and 0.4. The average thrust does not vary significantly with the stator tooth height ratio, as seen in FIG. 27. An optimal value was found between 0.4 and 0.6. Referring to FIG. 28, the optimal value of the translator tooth width was approximately 0.22. The FSLSM uses the slot width to focus the flux, and therefore, the higher the slot width, the higher the thrust. However, a lower limit of the translator tooth width was required to allow enough steel path for flux flow. After performing the individual parametric optimization, the back-emf of the optimized FSLSM and the detent force were obtained for the optimal values and are shown in FIG. 30 and FIG. 31, respectively. Variation of the average thrust for different magnet widths ($w_m$) is shown in FIG. 29. This provides important information as it tells us how much PM material can be packed into the given volume of the machine. It is seen that beyond a certain maximum width (e.g., 8 mm), the average thrust begins to decrease due to which adding more PM material will not increase thrust.

Translator tooth width ($w_{mt}$), stator tooth width ($w_{st}$), stator tooth height ($h_{st}$), stator back-iron width ($h_{sb}$), translator tooth height ($h_{mt}$) were chosen as the design variables. Again, volume of magnets, electrical loading, and dimensions of the FSLSM were set up to be constant throughout the optimization process.

TABLE D

Design Variables for Optimization

| Design variable | Definition | Initial value | Constraints |
|---|---|---|---|
| Split ratio | $(h_{st} + h_{sb})/h_t$ | 0.25 | [0.2, 0.45] |
| Stator tooth width ratio | $w_{st}/\tau_{sp}$ | 0.3 | [0.2, 0.5] |
| Stator tooth height ratio | $h_{st}/(h_{st} + h_{sb})$ | 0.4 | [0.3, 0.8] |
| Translator tooth width ratio | $(w_{mt} - w_m)2/\tau_{mp}$ | 0.2 | [0.1, 0.3] |

Population size and maximum generation were set at 30, and Pareto front was set at 10. The crossover type was chosen as simulated binary crossover with the individual crossover probability, variable crossover probability, and μ all set to 1. Variable exchange probability was set to 0. A polynomial type of mutation was selected where variable mutation probability and individual mutation probability were set to 1. Uniform mutation probability was set to 0, and the standard deviation was set to 0.05. Results from the GA optimization are listed in Table E. The results from the global optimization were similar to the results obtained from the individual parameter optimization.

TABLE E

Optimization Results

| Design variable | Definition | Individual optimization | Global optimization |
|---|---|---|---|
| Split ratio | $(h_{st} + h_{sb})/h_t$ | 0.32 | 0.27 |
| Stator tooth width ratio | $w_{st}/\tau_{sp}$ | 0.37 | 0.36 |
| Stator tooth height ratio | $h_{st}/(h_{st} + h_{sb})$ | 0.55 | 0.54 |
| Translator tooth width ratio | $(w_{mt} - w_m)/2\tau_{mp}$ | 0.22 | 0.2 |

Example 5

Ripple Minimization was performed on the optimized five-phase FSLSM from Examples 3 and 4. Thrust ripples can be minimized either by skewing or by suitably redesigning the excitation currents. As five phases were present in the FSLSM, it was possible to use it for fault-tolerant operation, in which case current control can play a significant role. Current control was used as a technique for minimizing thrust ripples under both healthy and open-circuit faulty conditions. In the healthy case, the currents were optimized based on the method proposed in [3]. Objective function was the minimization of stator ohmic losses given by, $$G = i^T i$$

where, $i = [i_a \ i_b \ i_c \ i_d \ i_e]^T$ is the instantaneous phase current vector. Optimization was performed at each time-step with a reference thrust set to $T_{ref}$. Constraints on the design variable (currents) were set up assuming that no neutral wire was available. As the coils are moving in the FSLSM, it is beneficial to have as little winding terminals as possible. Thus, the windings were assumed to be star-connected with a floating neutral. Accordingly, the constraints were $$T_{em} + T_{detent} = T_{ref}$$

and $$\sum_{k=a}^{e} i_k = 0$$

$T_{detent}$ is the measured detent force, and the electromagnetic thrust $T_{em}$ developed in the machine is given by, $$T_{em} = \sum_{k=a}^{e} i_k \frac{d\lambda k}{dx}$$

where, $d\lambda_k/d_x$ is the speed-normalized back-emf of phase k. The variable $i_k$ is the instantaneous current of phase k. In a star connection, the currents sum to zero and this constraint is given by, $$\sum_{k=a}^{e} i_k = 0$$

Figure 32:
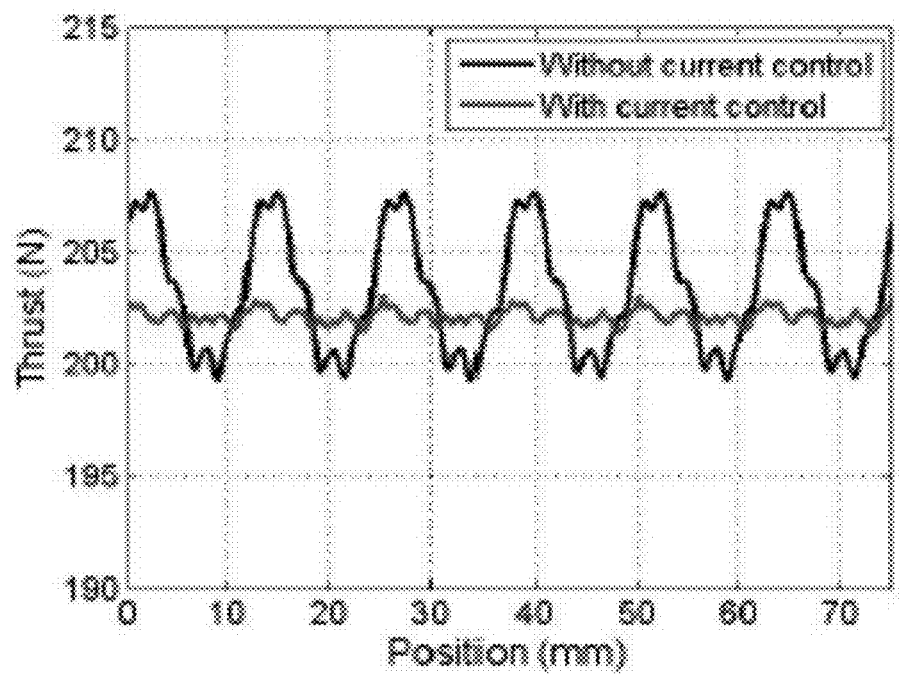
FIG. 32 is a plot showing thrust as a function of mechanical position.
Figure 36:
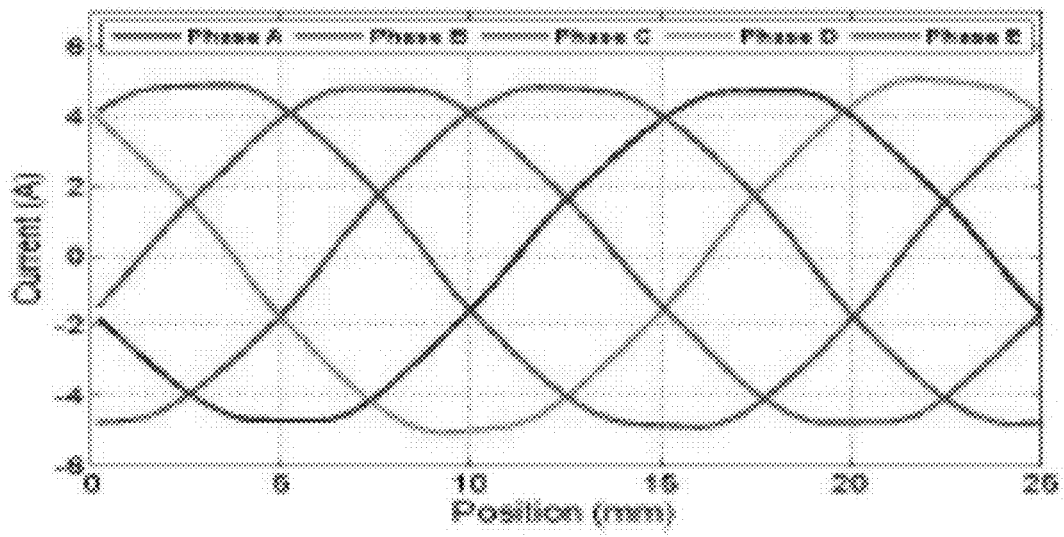
FIG. 36 is a plot showing current as a function of mechanical position.

As the reluctance component in the thrust is negligible, it was ignored when designing the currents under healthy conditions of the FSLSM. However, under faults the reluctance may cause ripples that cannot be ignored. FIG. 32 shows the thrusts obtained for the FSLSM for sinusoidal and optimal current excitation. Optimal currents obtained using the equations for G, $T_{ref}$, and the sum of $i_k$ are shown in FIG. 36. The currents were obtained by choosing $T_{ref}$=202 N-m. The thrust ripples were reduced from 4% to 0.5% of the average thrust when current control was used. This is highly desirable in many high precision applications.

Figure 33:
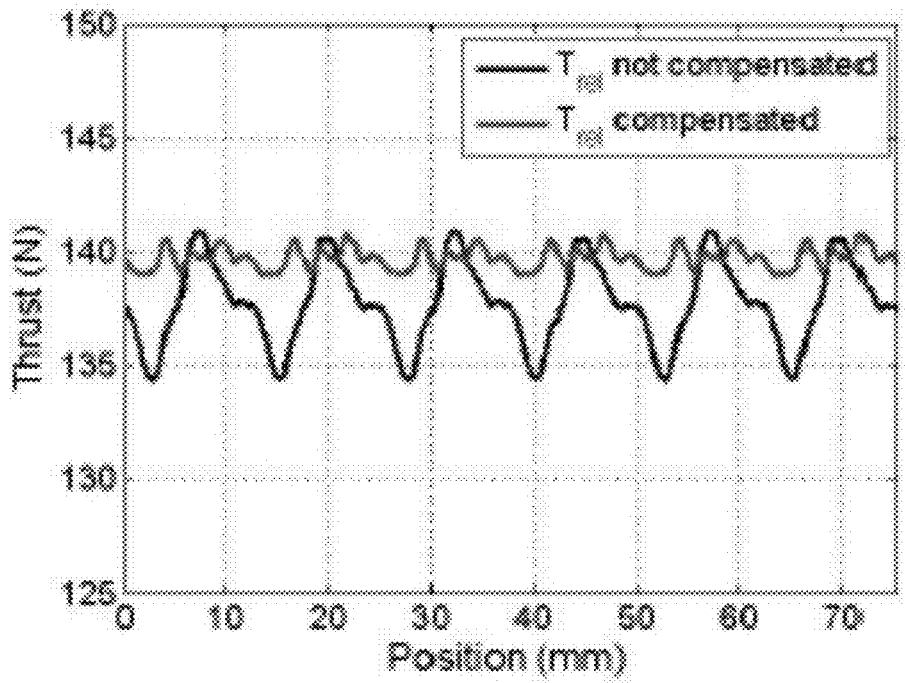
FIG. 33 is a plot showing thrust as a function of mechanical position.
Figure 34:
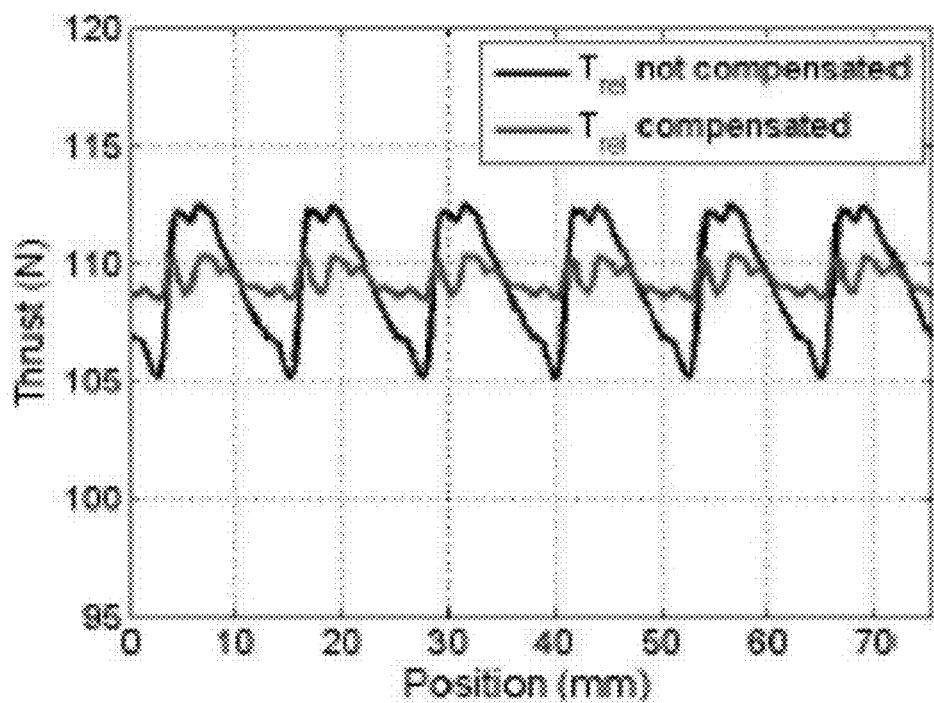
FIG. 34 is a plot showing thrust as a function of mechanical position.
Figure 35:
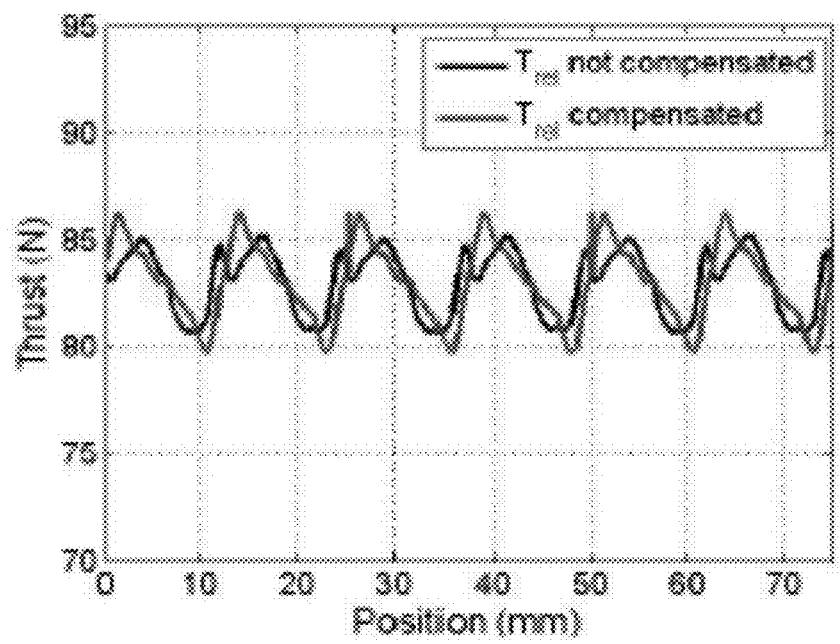
FIG. 35 is a plot showing thrust as a function of mechanical position.

While the method proposed in [3] worked well for the healthy machine, when the same method is applied to a machine with open-circuit faults, the results were not satisfactory. FIGS. 33, 34, and 35 of thrust vs. position show that the thrust ripples were quite high. As the detent force was also considered in the thrust optimization, one other contribution for thrust ripples can be from the variation in reluctances. For a doubly-salient machine such as a flux-switching machine, reluctance variations can be quite high and can show up easily under unbalanced conditions. In order to include this effect of reluctance thrust, we can rewrite the above thrust equation as, $$T_{em} + T_{detent} + T_{rel} = T_{ref}$$

The reluctance thrust developed in a linear machine is given by, $$T_{rel} = \frac{1}{2} i^T \frac{dL}{dx} i$$

The inductance matrix L is given by, $$L = \begin{bmatrix} L_a & M_{ab} & M_{ac} & M_{ad} & M_{ae} \\ M_{ba} & L_b & M_{bc} & M_{bd} & M_{be} \\ M_{ca} & M_{cb} & L_c & M_{cd} & M_{ce} \\ M_{da} & M_{db} & M_{dc} & L_d & M_{de} \\ M_{ea} & M_{eb} & M_{ec} & M_{ed} & L_e \end{bmatrix}$$

where $L_i$ is the self-inductance of any phase i and $M_{ij}$ is the mutual inductance between phases i and j. The inductance matrix is obtained from FE analysis of the FSLSM. The results obtained using the new thrust equation in place of the previous thrust equation are shown in FIGS. 33, 34, and 35, and the ripple percentages are summarized in Table F. Using this method, excellent ripple minimization was obtained for a single-phase fault and for a double-phase non-adjacent fault. However, for the more severe double-phase adjacent fault, the ripple percentage could not be minimized. This is expected to be due to other non-linearities existing in the FSLSM. Adjacent phases does not mean that they are physically beside each other, but rather they are adjacent in the electrical sense.

TABLE F

Ripple Minimization Using Current Control Under Healthy and Open-Circuit Fault Conditions

| Fault Condition | $T_{rel}$ compensated | Average Thrust (N) | Ripple (%) | Current RMS (A) $I_a$ | $I_b$ | $I_c$ | $I_d$ | $I_e$ |
|---|---|---|---|---|---|---|---|---|
| Healthy - sine currents | x | 203.0 | 4.00 | 2.97 | 2.97 | 2.97 | 2.97 | 2.97 |
| Healthy - optimal currents | x | 202.0 | 0.50 | 2.82 | 2.95 | 2.89 | 2.98 | 2.84 |
| Phase A open | x | 137.7 | 4.80 | 0 | 2.34 | 2.86 | 2.97 | 2.23 |
|  | ✓ | 139.7 | 1.34 | 0 | 2.37 | 2.94 | 2.97 | 2.26 |
| Non-adjacent phases A and B open | x | 109.2 | 6.71 | 0 | 0 | 2.87 | 2.96 | 2.88 |
|  | ✓ | 109.3 | 1.81 | 0 | 0 | 2.92 | 2.96 | 2.83 |
| Adjacent phases B and D open | x | 83.0 | 6.02 | 2.93 | 0 | 2.96 | 0 | 2.85 |
|  | ✓ | 83.0 | 7.80 | 2.87 | 0 | 2.96 | 0 | 2.90 |

Figure 37:
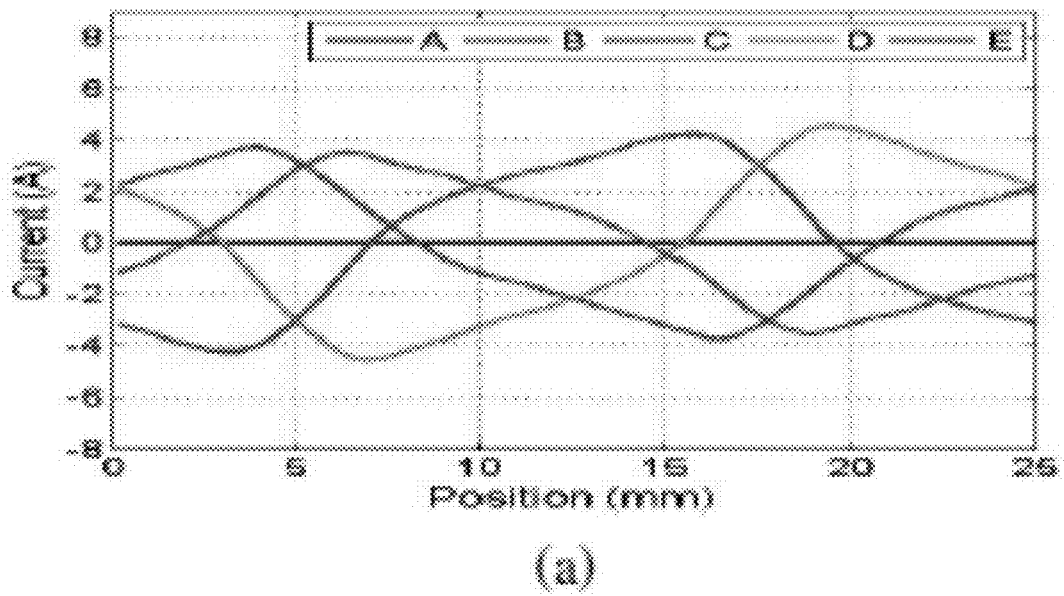
FIG. 37a is a plot showing current as a function of mechanical position when phase A is open and $T_{rel}$ is not considered.
FIG. 37b is a plot showing current as a function of mechanical position when phase A is open and $T_{rel}$ is considered.
Figure 37:
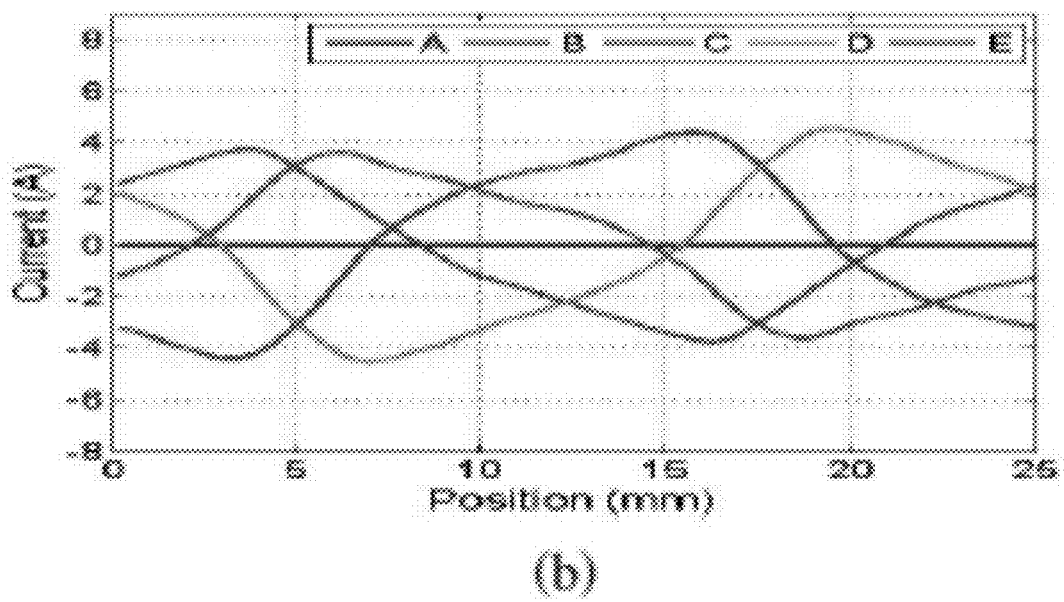
Figure 38:
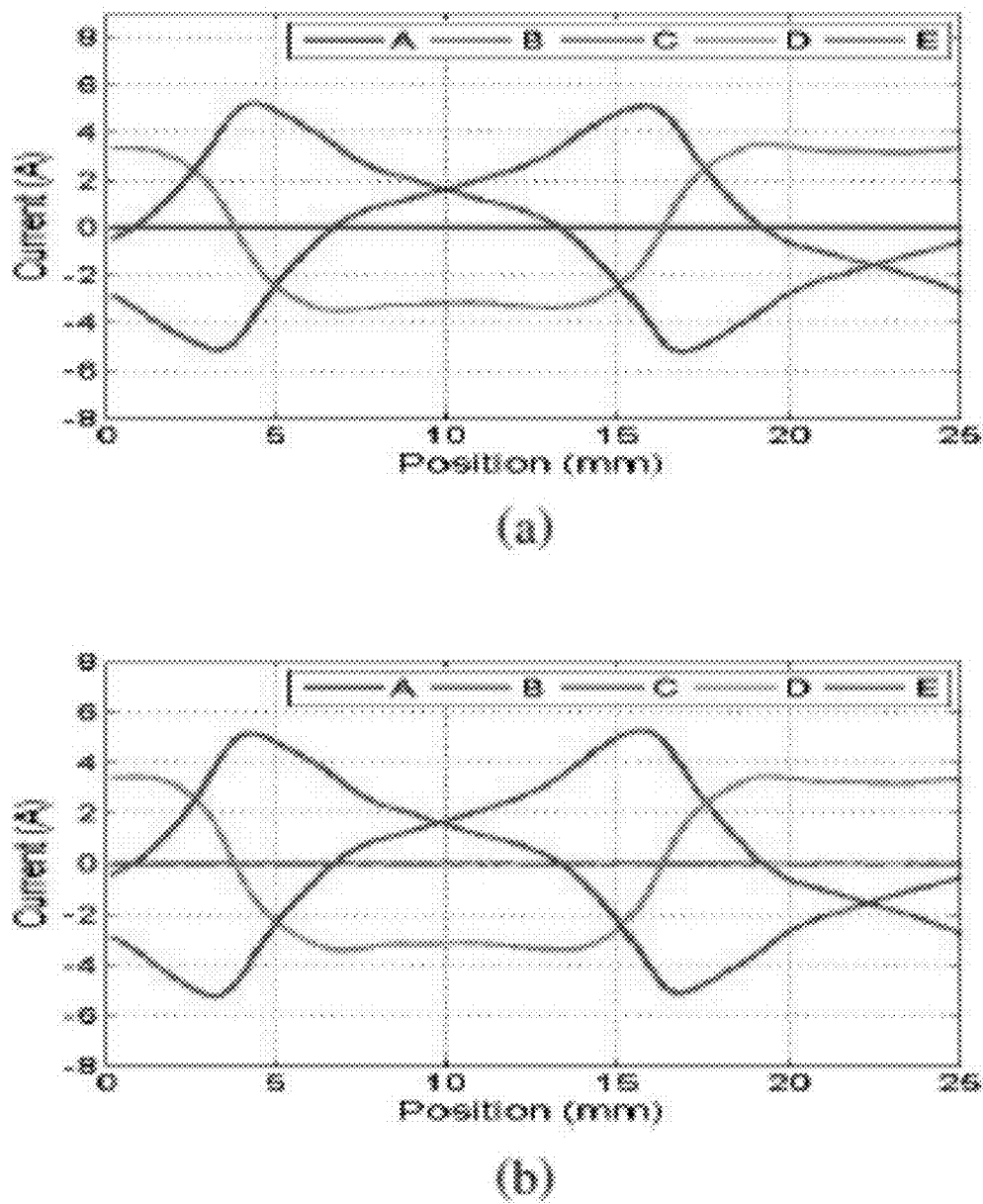
FIG. 38a is a plot showing current as a function of mechanical position when non-adjacent phases A and B are open and $T_{rel}$ is not considered.
FIG. 38b is a plot showing current as a function of mechanical position when non-adjacent phases A and B are open and $T_{rel}$ is considered.
Figure 39:
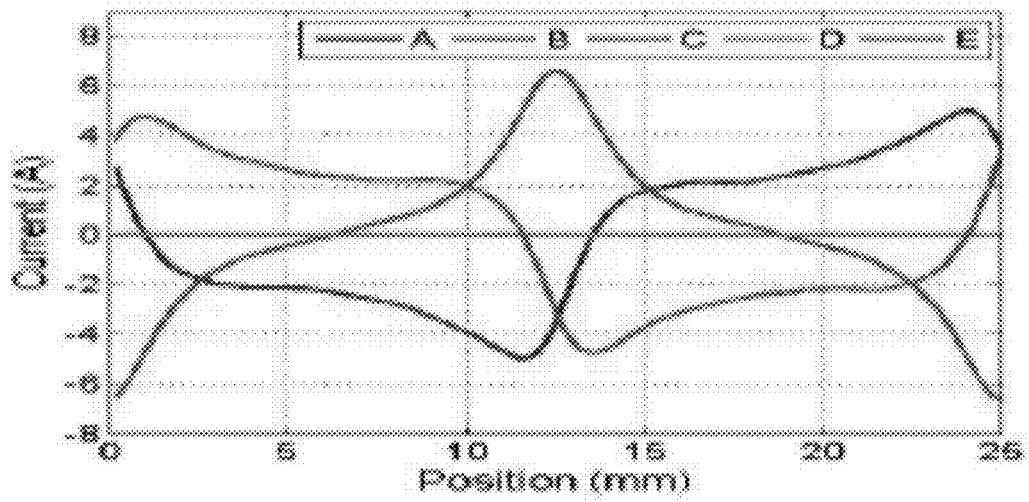
FIG. 39a is a plot showing current as a function of mechanical position when adjacent phases B and D are open and $T_{rel}$ is not considered.
FIG. 39b is a plot showing current as a function of mechanical position when adjacent phases B and D are open and $T_{rel}$ is considered.
Figure 39:
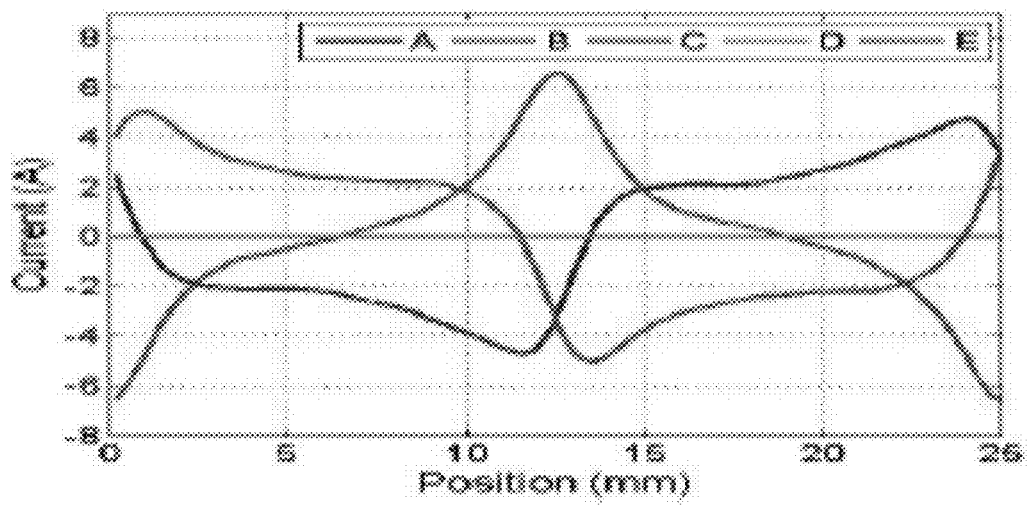

FIGS. 37a, 37b, 38a, 38b, 39a, and 39b show the optimal currents under different open-circuit fault conditions. In FIG. 37a, phase A is open and $T_{rel}$ is not considered. In FIG. 37b, phase A is open and $T_{rel}$ is considered. In FIG. 38a, non-adjacent phases A and B are open and $T_{rel}$ is not considered. In FIG. 38b, non-adjacent phases A and B are open and $T_{rel}$ is considered. In FIG. 39a, adjacent phases B and D are open and $T_{rel}$ is not considered. In FIG. 39b, adjacent phases B and D are open and $T_{rel}$ is considered. The currents peak often when the faults are severe.

Figure 40:
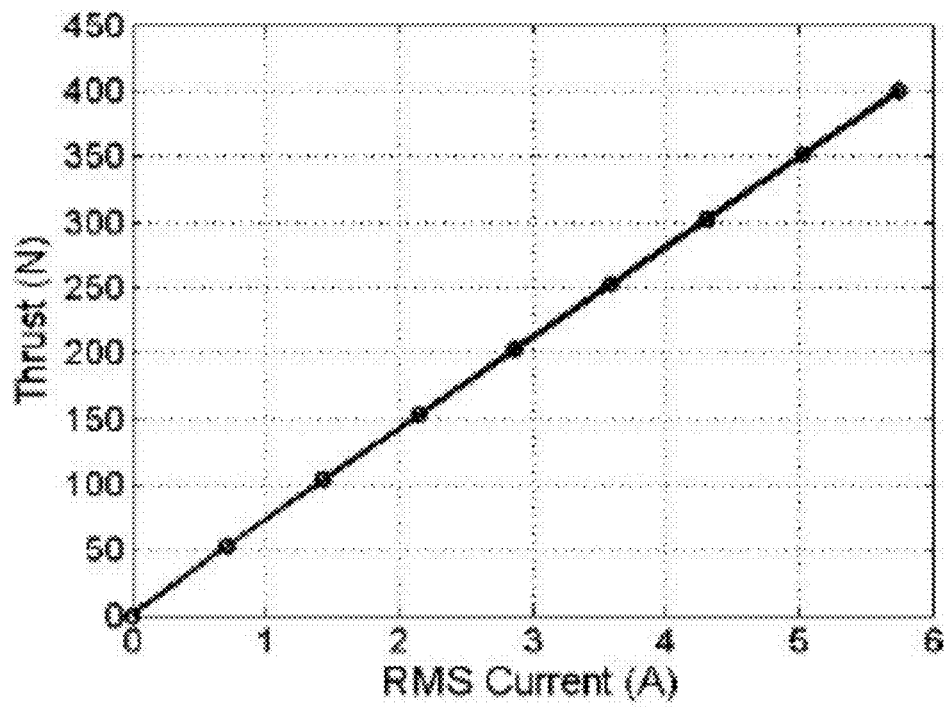
FIG. 40 shows a plot of thrust as a function of RMS current.

FIG. 40 shows a curve of thrust vs. input current for the FSLSM, and the FSLSM does not saturate completely even for twice the RMS current. This means that the optimal currents do not saturate the motor at any instant despite the large peaks.

Thus, with current control, it possible to achieve thrust ripples as low as 0.5% of the average thrust. Under open-circuit fault conditions, reluctance thrust has a noticeable effect on the thrust ripples. The optimization method was suitably redesigned to improve the performance. Under single-phase faults and non-adjacent double-phase faults, the thrust ripples were reduced by more than 4 times as compared to traditional methods.

Example 6

An FSLSM according to an embodiment of the subject invention was compared to an existing FSLSM. The FSLSM of the subject invention used for comparison was a 3-phase, 6-slot/10-pole motor having six PMs. A cross-sectional diagram of the FSLSM of the subject invention is shown in FIG. 2.

Figure 7:
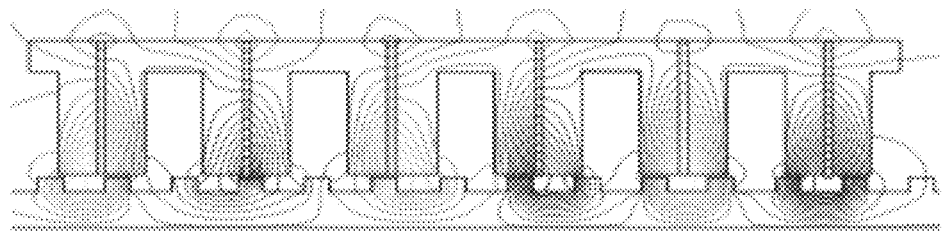
FIG. 7 is a cross-sectional diagram showing open-circuit flux lines of an existing motor.
Figure 8:
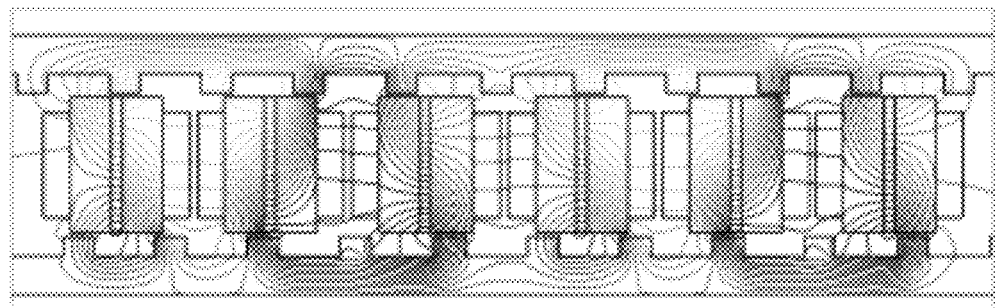
FIG. 8 is a cross-sectional diagram showing open-circuit flux lines of a motor according to an embodiment of the subject invention.

The existing FSLSM used for comparison was a C-core, 3-phase, 6-slot/13-pole motor, and is shown in FIG. 1. Both the existing FSLSM and the FSLSM of the subject invention had the same winding current density, magnetic material, core material, volume of magnets, and volume of active steel in order to allow for a fair comparison. However, in the FSLSM of the subject invention, a double-sided topology was used and all magnets were magnetized in same direction, whereas in the existing design, the magnets in adjacent teeth were oppositely magnetized. Both motors had concentrated windings. Parameters of the two FSLSM designs are shown in Table G. The parameters for the FSLSM of the subject invention are under the heading "Proposed", while the parameters for the existing FSLSM are under the heading "Conventional". The two stators of the FSLSM of the subject invention were displaced by half a pole-pitch in order to maintain symmetry for flux flow. Open-circuit flux lines of the existing FSLSM are shown in FIG. 7, and open-circuit flux lines of the FSLSM according to an embodiment of the subject invention are shown in FIG. 8. The FSLSM according to an embodiment of the subject invention utilizes the width of winding slots to focus the flux through stator teeth.

Strong NdFeB magnets were used as the PMs. Laminated carbon steel 1010 was used as the material for the stator (and translator in the simulations). There typically are practical issues in the installation of strong magnets in conventional PM machines, but in the FSLSM of the subject invention, the translator can advantageously be assembled first and then, the PMs can be magnetized as all the PMs are magnetized in the same direction. Using steel core in the translator improves the mechanical strength of magnets as well. There should be no magnetic path between the translator teeth and therefore, the translator components were held together by a non-magnetic material such as epoxy resin.

TABLE G

Design Specifications for Comparison

| Parameter | Symbol | Conventional | Proposed |
|---|---|---|---|
| Pole pitch | $\tau_{sp}$ | 18.46 mm | 24 mm |
| PM width | $w_m$ | 2.12 mm | 2.74 mm |
| PM height | $h_m$ | 45.3 mm | 35 mm |
| PM pole pitch | $\tau_{mp}$ | 40 mm | 40 mm |
| Airgap | g | 1 mm | 1 mm |
| Stator tooth width | $w_{st}$ | 7 mm | 8 mm |
| Stator tooth height | $h_{st}$ | 5 mm | 5 mm |
| Translator tooth width | $w_{mt}$ | 24 mm | 24 mm |
| PM residual flux density | $B_r$ | 1.15 T | 1.15 T |
| Machine depth | D | 100 mm | 100 mm |
| Translator length | L | 240 mm | 240 mm |
| Active machine volume | $Vol_a$ | 1.52 cm³ | 1.61 cm³ |
| Mass of active part of machine (excluding resin mass) | $M_a$ | 10.47 kg | 10.31 kg |
| Mass of Translator (excluding resin mass) | $M_m$ | 7.87 kg | 5.94 kg |
| Rated output power | $P_o$ | 280 W | 430 W |
| Input phase voltage rms | $V_{in}$ | 163 V | 71 V |
| Power factor | pf | 0.168 | 0.6 |

Figure 42:
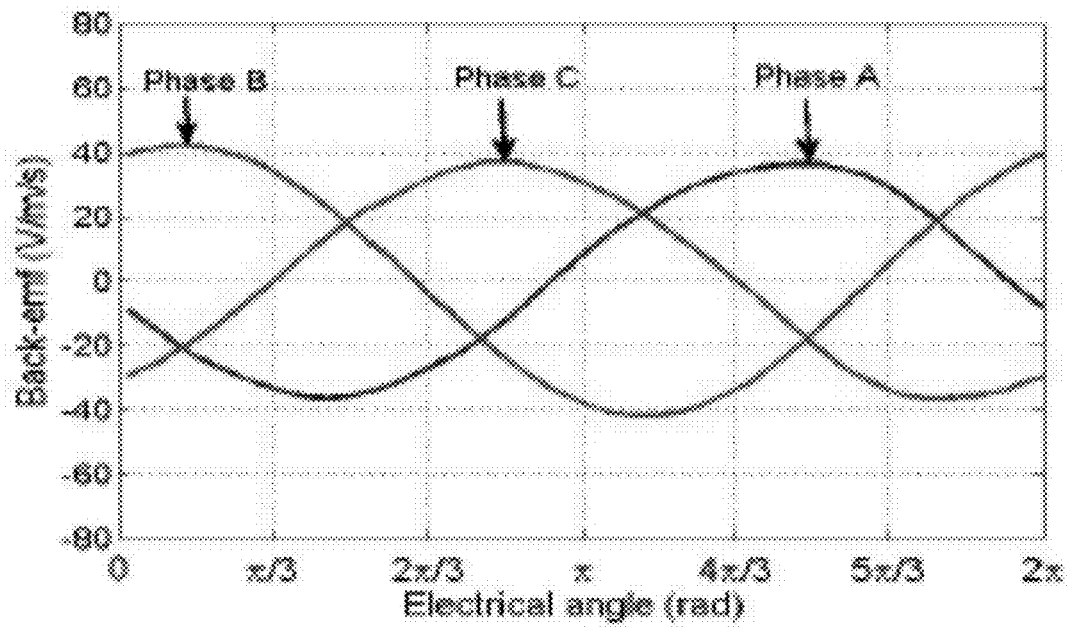
FIG. 42 is a plot showing back-emf as a function of electrical angle for an existing motor.
Figure 43:
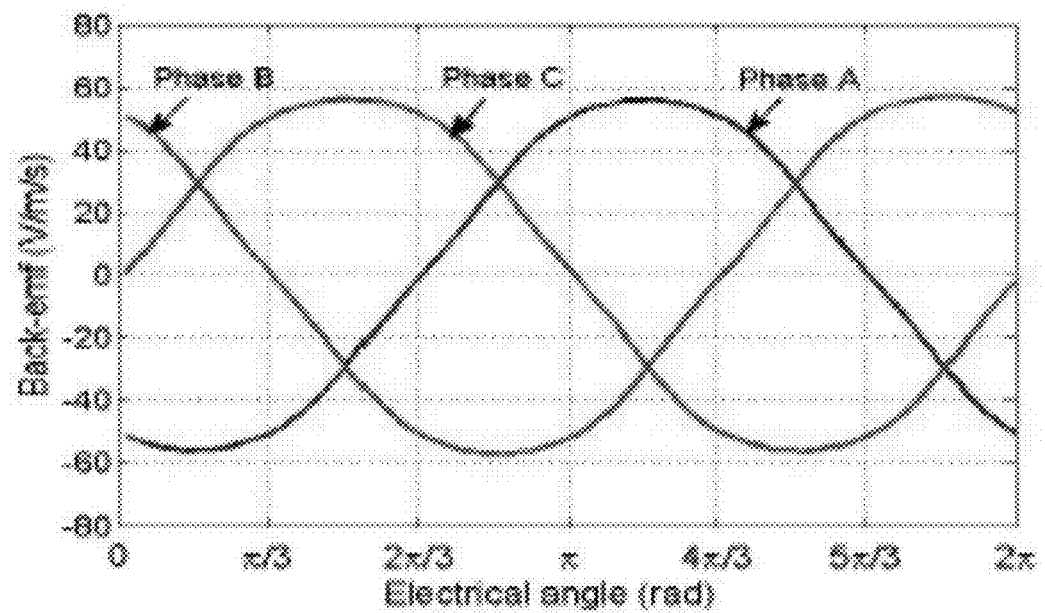
FIG. 43 is a plot showing back-emf as a function of electrical angle for a motor according to an embodiment of the subject invention.

Due to their complex geometry and non-linearity, closed-form solutions of flux-switching machines are difficult to obtain. Hence, the existing FSLSM and FSLSM according to an embodiment of the subject invention were analyzed using 2-D FE methods. Speed-normalized back-emfs for the existing FSLSM (FIG. 42) and the FSLSM of the subject invention (FIG. 43) were obtained from the normalized flux linkages using the following equation, $$e_i = \frac{d\lambda_i}{dt}$$

where $\lambda_i$ is the speed-normalized flux linkage of phase i. All three phases of the FSLSM of the subject invention have almost the same back-emf amplitude. However, in the existing FSLSM, end phases have lower amplitudes of back-emf when compared to the middle phase. Also, the amplitude of the back-emfs is higher in the FSLSM of the subject invention although the volume of PMs is the same. This is at least in part because the FSLSM of the subject invention has better flux focusing than the existing FSLSM.

Figure 41:
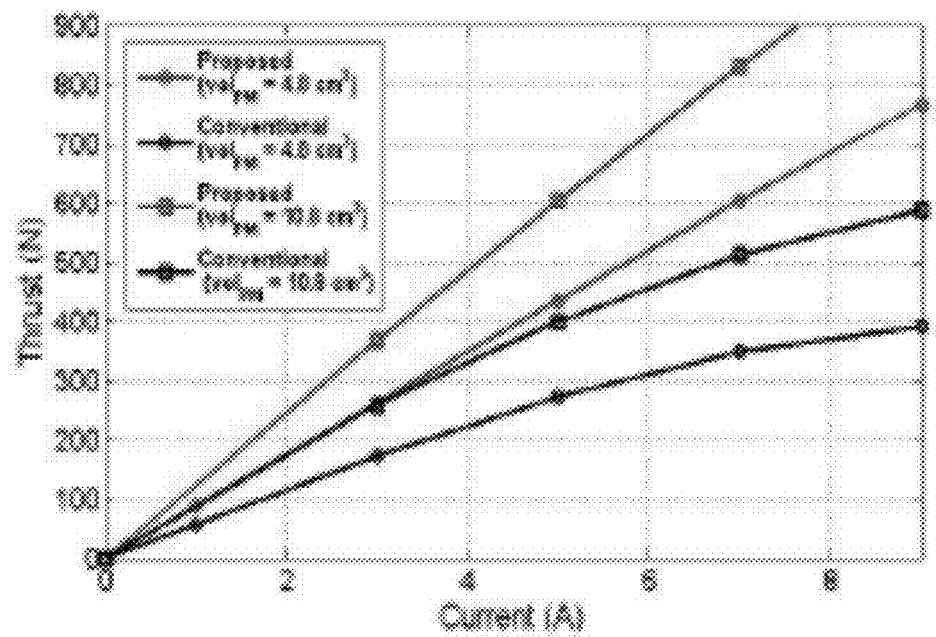
FIG. 41 shows a plot of thrust as a function of current.

Under nominal conditions, both the FSLSM of the subject invention and the existing FSLSM were fed by sinusoidal currents with a peak amplitude of 5 A. FIG. 11 shows the thrust-position (similar to torque-angle) curve of the two FSLSMs. For the same current densities, the maximum thrust obtained from the FSLSM of the subject invention is 56% higher than that of the existing FSLSM. Average thrusts for different input current amplitudes are shown in FIG. 41 where, $vol_{PM}$ is the volume of one magnet. The FSLSM of the subject invention has excellent linearity even under very high excitation currents. The yokeless translator in the FSLSM of the subject invention ensures that the steel is better utilized. Plots of the magnitude of flux density are shown in FIG. 16a (for existing FSLSM) and FIG. 16b (for FSLSM of the subject invention) for input current of amplitude 7 A. In the existing FSLSM, one of the stator teeth is already completely saturated.

Figure 44:
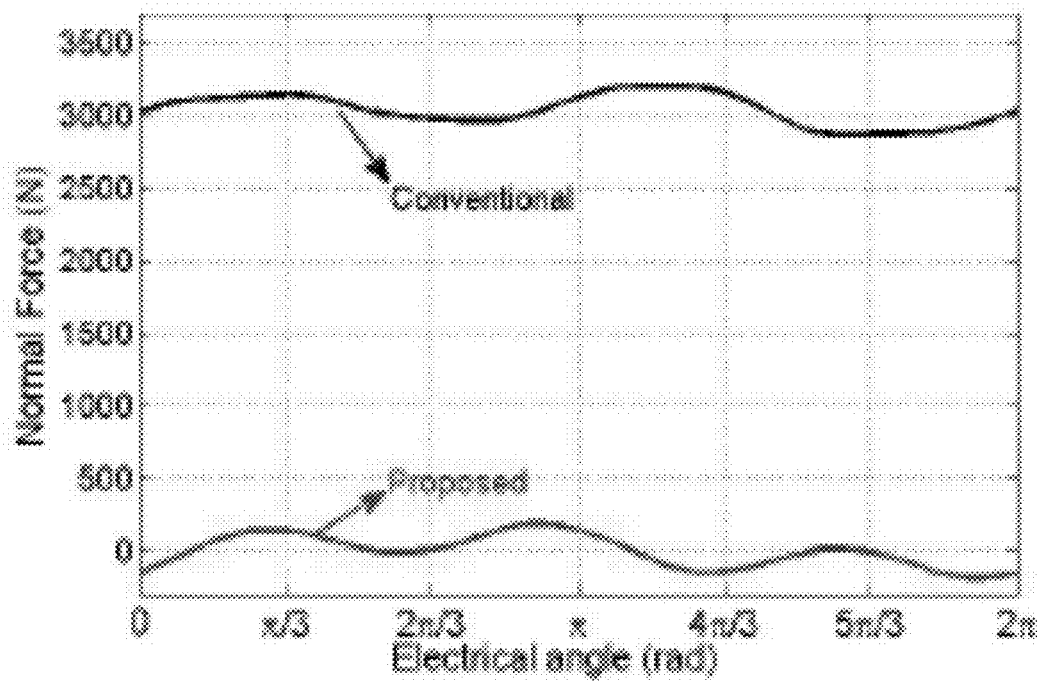
FIG. 44 is a plot showing force as a function of electrical angle.
Figure 45:
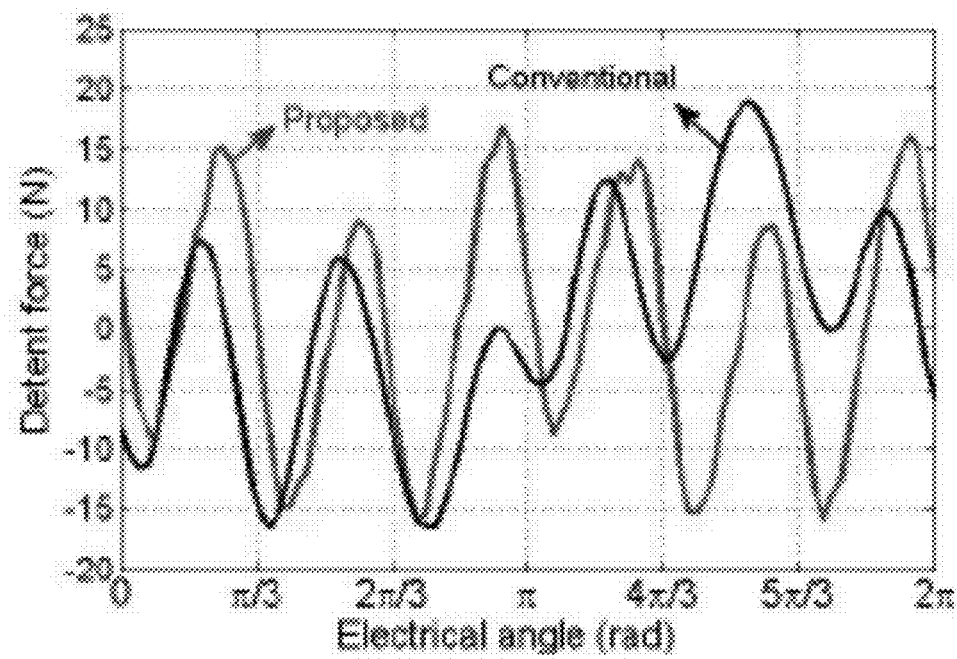
FIG. 45 is a plot showing force as a function of electrical angle.

Due at least in part to the double-sided structure of the FSLSM of the subject invention, the average normal force on the translator was zero or very close to zero. However, oscillations were present due to saliency, which can be observed in FIG. 44. Single-sided PM linear motors need strong linear bearings to withstand the very high normal forces. Referring to FIG. 45, the peak-to-peak amplitude of the cogging (detent) force is similar in the existing FSLSM and the FSLSM of the subject invention. The detent force is about 13% in the existing FSLSM and 8% in the FSLSM of the subject invention, which is still high for certain high-precision applications.

Example 7

Figure 46:
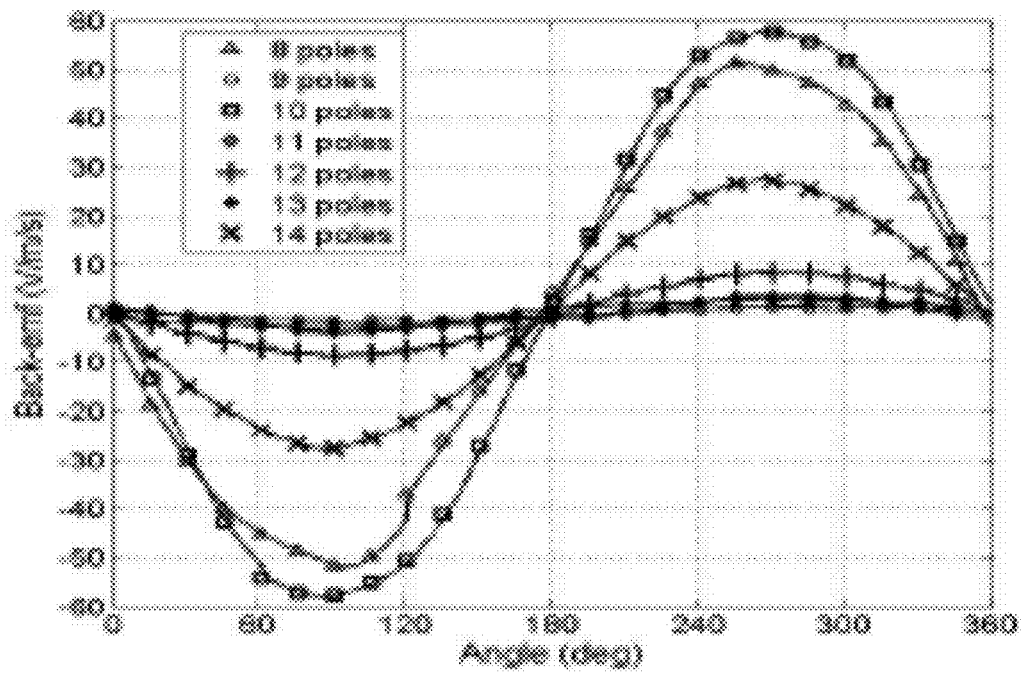
FIG. 46 is a plot showing back-emf as a function of electrical angle.

The FSLSM of the subject invention discussed in Example 6 was optimized to obtain maximum average thrust using individual parameter optimization. The input current density, overall volume of the machine, and magnet volume were kept constant during the optimization procedure. Then, the results of the individual parameter optimization were compared with a global optimization technique based on GA. Before optimization based on geometrical parameters was done, a particular slot-pole combination of the proposed design was chosen based on back-emf amplitudes. The number of slots was kept to a minimum of 6, which is the minimum number of slots that ensures a symmetrical back-emf. FIG. 46 plainly shows that the best performance can be obtained for 10 stator poles.

Design variables for the optimization, their initial values, and constraints are listed in Table H. The order in which the variables are listed is the order in which the optimization was performed. As it was an individual parameter optimization, only one design variable was varied while the others were kept constant in each step of the optimization process. Optimized value of a design parameter from the previous step was carried on to the next step of the optimization process.

Figure 47:
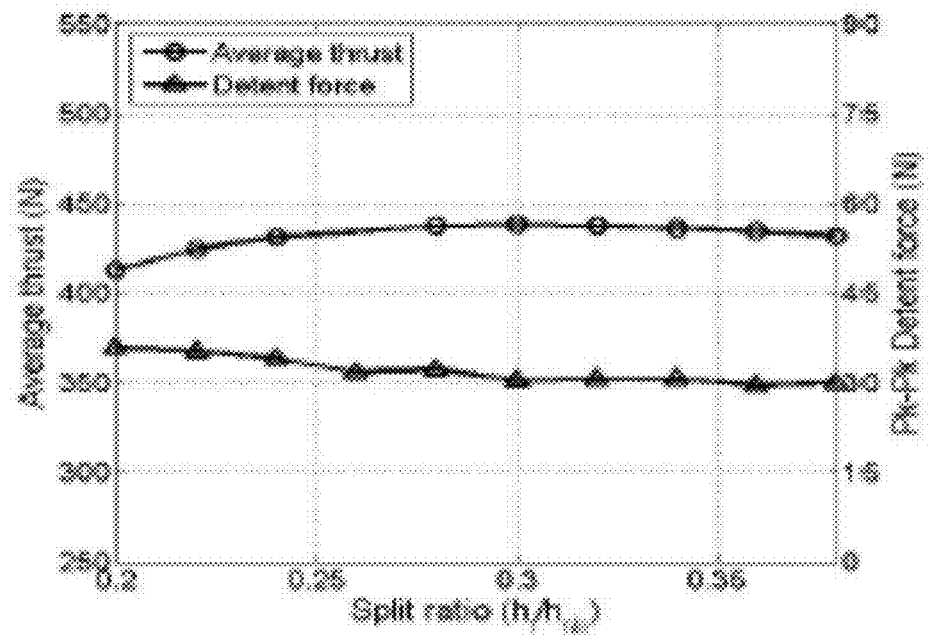
FIG. 47 is a plot showing thrust as a function of split ratio.
Figure 48:
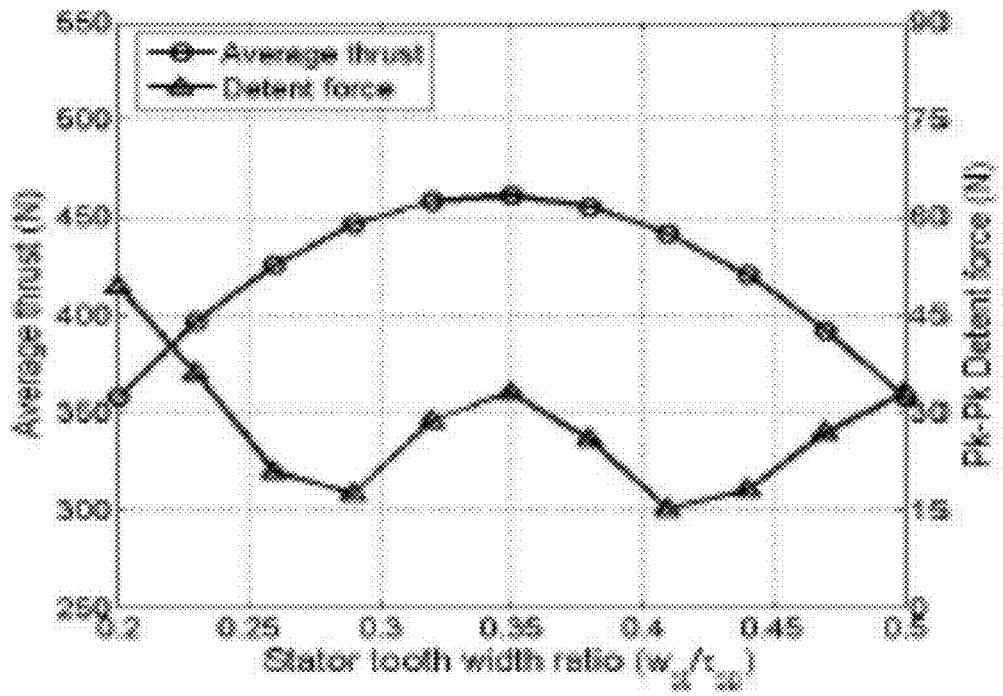
FIG. 48 is a plot showing thrust as a function of stator tooth width ratio.
Figure 49:
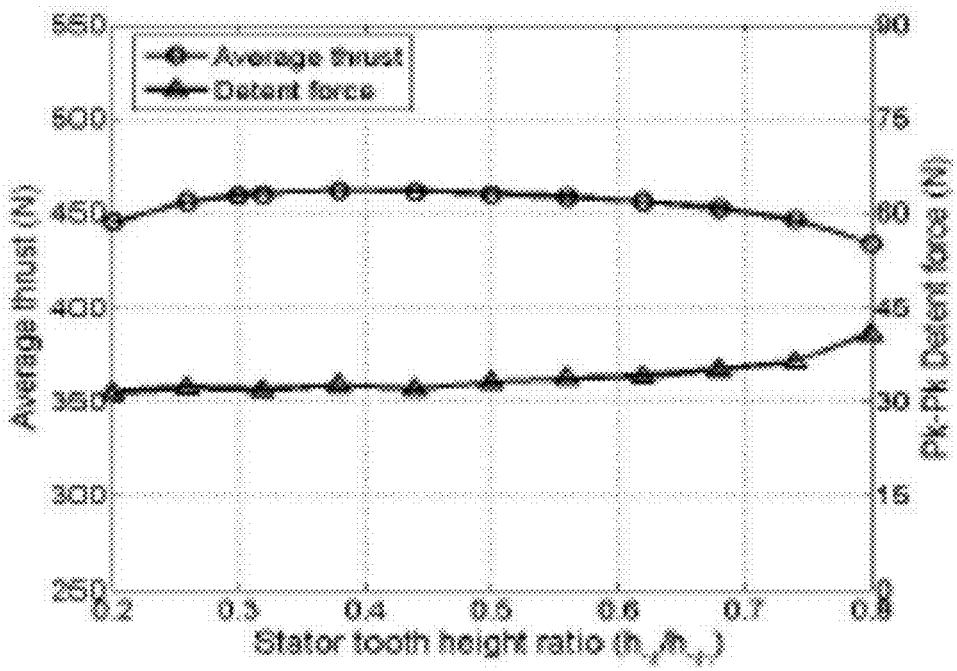
FIG. 49 is a plot showing thrust as a function of stator tooth height ratio.
Figure 50:
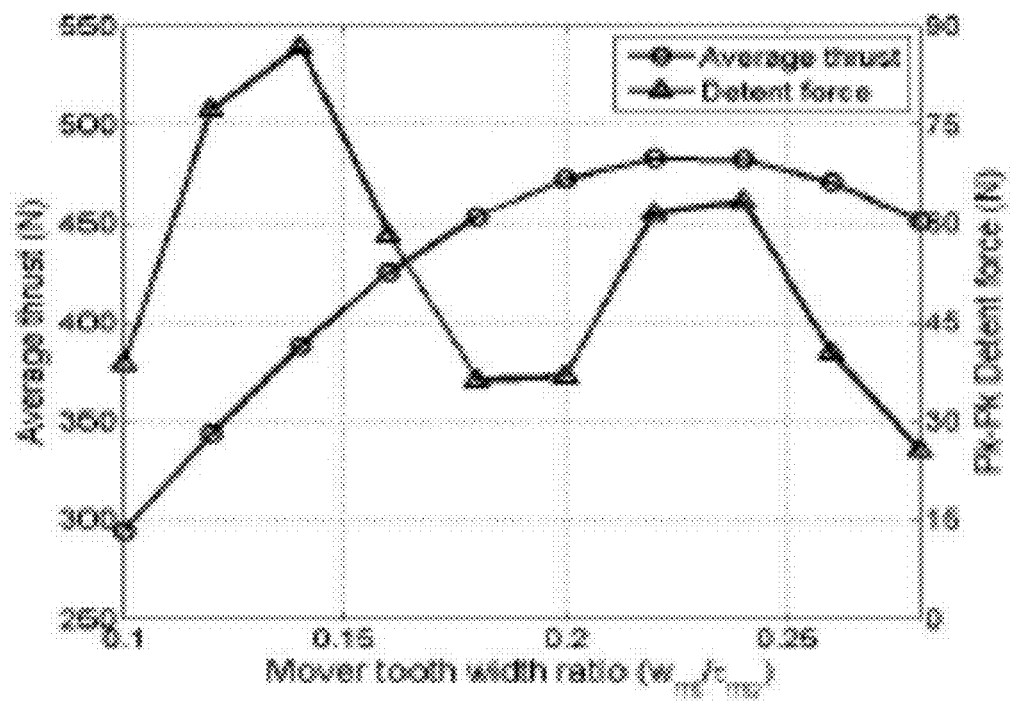
FIG. 50 is a plot showing thrust as a function of translator tooth width ratio.

FIG. 47 shows the variation of average thrust with the split ratio of the machine. While the split ratio was varied, back-iron thickness ($h_{sb}$) was assumed to be equal to the tooth height of the stator ($h_{st}$). The optimized value of the split ratio was in the range of 0.28 to 0.32, which is marginally higher than for existing FSLSMs [4]. The average thrust was not highly sensitive to the split ratio, and choosing a lower value serves well as the dimensions of the machine are reduced. Variation of the average thrust with the stator tooth width ratio is shown in FIG. 48. Once again, the optimal value (about 0.35) was higher than for existing FSLSMs [4]. The average thrust does not vary significantly with the stator tooth height ratio (FIG. 49). An optimal value was found between 0.3 and 0.5. The optimal value of the translator tooth width (FIG. 50) was found to be approximately 0.22, which is lower than for existing FSLSMs [4]. This was expected because the FSLSM of the subject invention uses the slot width to focus the flux, and so, the thrust increases with increase in slot width. However, a lower limit of the translator tooth width is required to allow enough steel path for flux flow.

TABLE H

Design Variables for Optimization

| Design variable | Definition | Initial value | Constraints |
|---|---|---|---|
| Split ratio | $\frac{h_{st} + h_{sb}}{h_t}$ | 0.25 | [0.2, 0.38] |
| Stator tooth width ratio | $\frac{w_{st}}{\tau_{sp}}$ | 0.3 | [0.2, 0.5] |
| Stator tooth height ratio | $\frac{h_{st}}{h_{st} + h_{sb}}$ | 0.4 | [0.2, 0.8] |
| Translator tooth width ratio | $\frac{w_{mt} - w_m}{2\tau mp}$ | 0.2 | [0.1, 0.28] |

Figure 51:
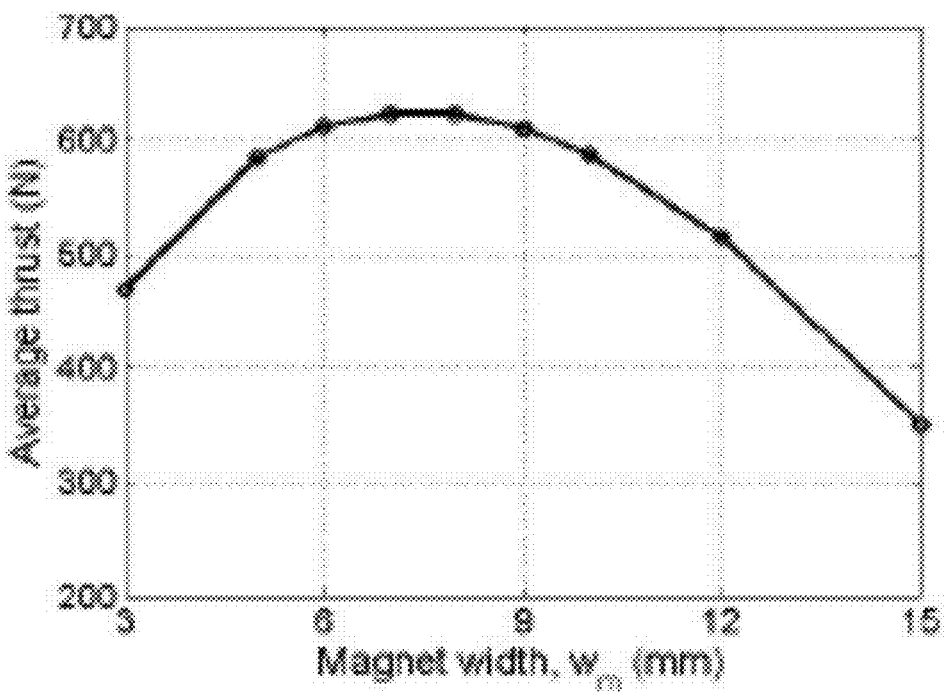
FIG. 51 is a plot showing thrust as a function of magnet width.

FIG. 51 shows variation of the average thrust for different magnet widths ($w_m$). This study helps in the determination of the maximum quantity of PMs that can be packed into a given volume of the FSLSM. Beyond a certain maximum width (~8 mm), the average thrust begins to decrease, so beyond this point adding more PMs does not increase thrust.

Translator tooth width ($w_{mt}$), stator tooth width ($w_{st}$), stator tooth height ($h_{st}$), stator back-iron width ($h_{sb}$), and translator tooth height ($h_{mt}$) were chosen as the design variables. Again, volume of magnets, winding current density, and dimensions of the FSLSM were set up to be constant throughout the optimization process. Population size and maximum generation were set at 30. Pareto front was set at 10. The crossover type was chosen as simulated binary crossover with the individual crossover probability, variable crossover probability, and μ all set to 1. Variable exchange probability was set to 0. A polynomial type of mutation was selected where variable mutation probability and individual mutation probability were set to 1. Uniform mutation probability was set to 0, and the standard deviation was set to 0.05. Results from the GA optimization are listed in Table I. The results from the global optimization are similar to the results obtained from the individual parameter optimization.

TABLE I

Optimization Results

| Design variable | Definition | Individual optimization | Global optimization |
|---|---|---|---|
| Split ratio | $\frac{h_{st} + h_{sb}}{h_t}$ | 0.32 | 0.27 |
| Stator tooth width ratio | $\frac{w_{st}}{\tau_{sp}}$ | 0.35 | 0.34 |
| Stator tooth height ratio | $\frac{h_{st}}{h_{st} + h_{sb}}$ | 0.4 | 0.37 |

TABLE I-continued

Optimization Results

| Design variable | Definition | Individual optimization | Global optimization |
|---|---|---|---|
| Translator tooth width ratio | $\frac{w_{mt} - w_m}{2\tau_{mp}}$ | 0.2 | 0.22 |

Example 8

Figure 52:
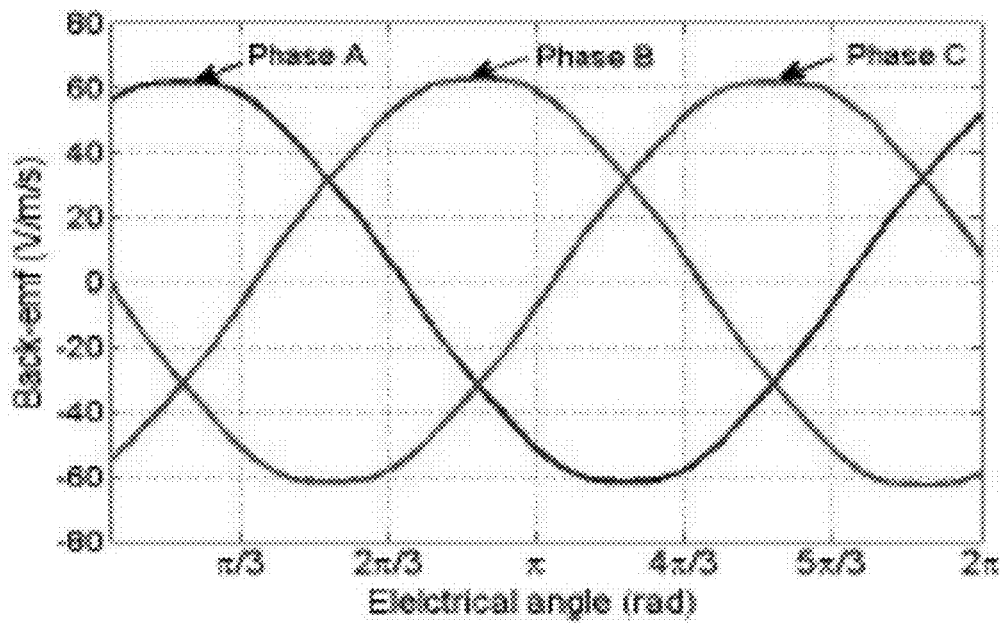
FIG. 52 is a plot showing back-emf as a function of electrical angle.
Figure 53:
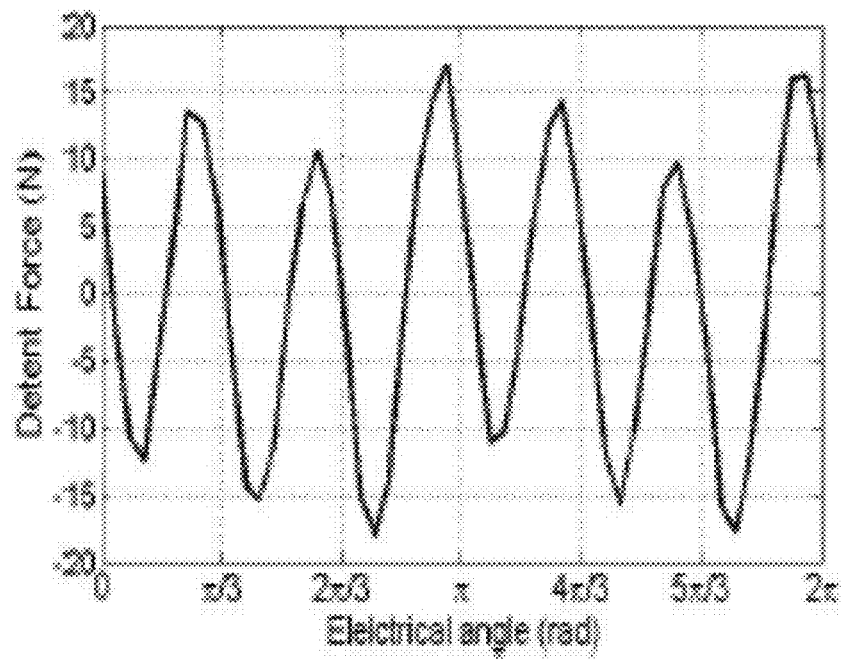
FIG. 53 is a plot showing force as a function of electrical angle.
Figure 54:
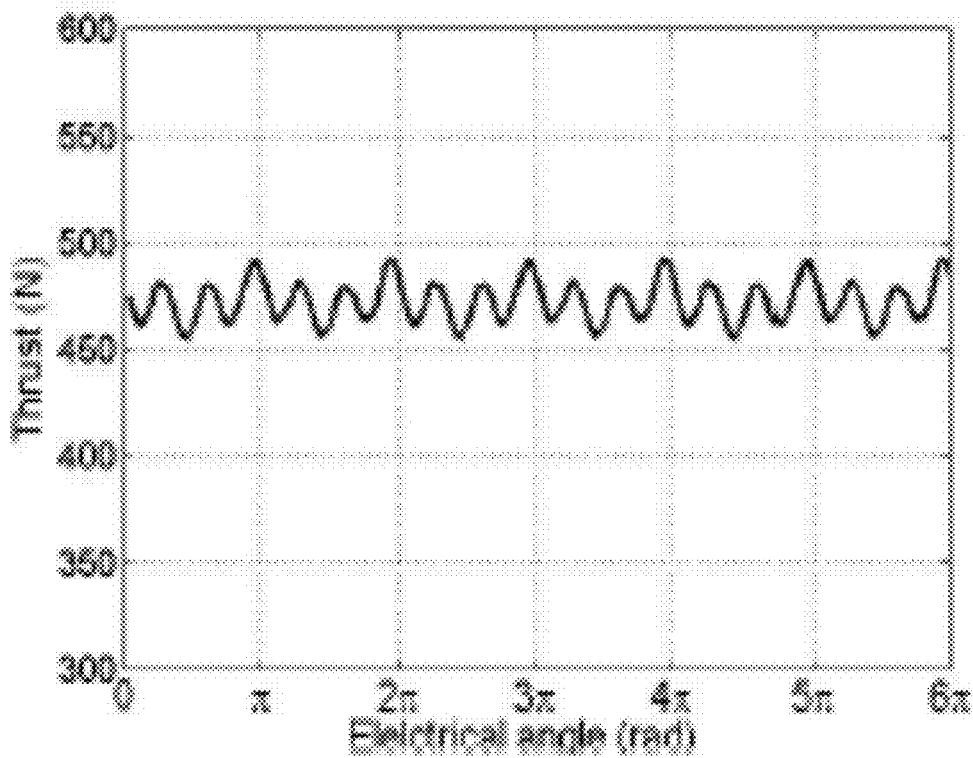
FIG. 54 is a plot showing thrust as a function of electrical angle.

The optimized FSLSM of Example 7 was optimized further for thrust ripples. While maximum average thrust is highly desirable, certain applications also require high precision and therefore, low thrust ripples. For this purpose, it is important to investigate the peak-to-peak (pk-pk) detent force for these same variations, as detent force is the major component of thrust ripples in an FSLSM. FIGS. 47, 48, 49, and 50 show the variation of pk-pk detent force with respect to the optimization variables. The detent force is most sensitive to translator tooth width and stator tooth width variations. Choosing a translator tooth width ratio of 0.22 gives the maximum average thrust of 482 N, but the detent force is 12.5% of the average thrust. On the other hand, choosing a value of 0.2 for the ratio gives a thrust of 472 N and now, the detent force is only 7.4%. Skewing can be used to further reduce the detent force, though skewing also reduces the maximum average thrust obtainable from the motor. Alternatively, it is possible to profile the input currents such that the thrust ripple is reduced. Optimal parameters of the FSLSM are shown in Table J. Back-emf and detent force of the optimized FSLSM were obtained and are shown in FIG. 52 and FIG. 53, respectively. The thrust produced by the optimized FSLSM is shown in FIG. 54.

TABLE J

Design Specifications for Three-Phase FSLSM

| Parameter | Symbol | Proposed |
|---|---|---|
| Pole pitch | $\tau_{sp}$ | 24 mm |
| PM width | $w_m$ | 2.74 mm |
| PM height | $h_m$ | 35 mm |
| PM pole pitch | $\tau_{mp}$ | 40 mm |
| Airgap | g | 1 mm |
| Stator tooth width | $w_{st}$ | 8.4 mm |
| Stator tooth height | $h_{st}$ | 11.1 mm |
| Translator tooth width | $w_{mt}$ | 18.74 mm |
| PM residual flux density | $B_r$ | 1.15 T |
| Machine depth | D | 100 mm |
| Translator length | L | 240 mm |

Example 9

Figure 55:
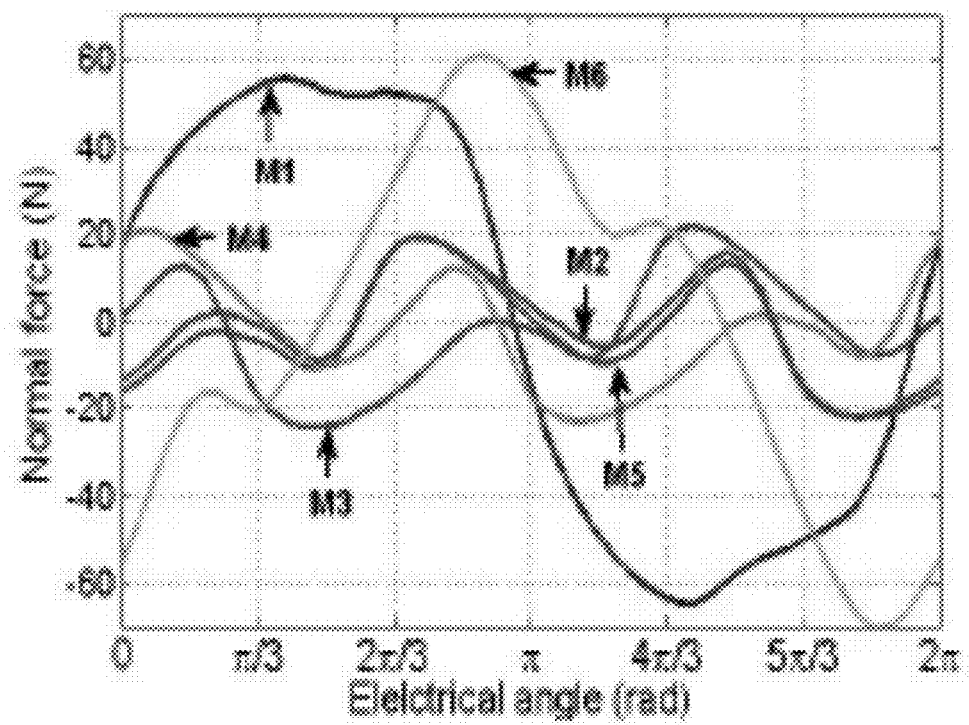
FIG. 55 is a plot showing force as a function of electrical angle.
Figure 56:
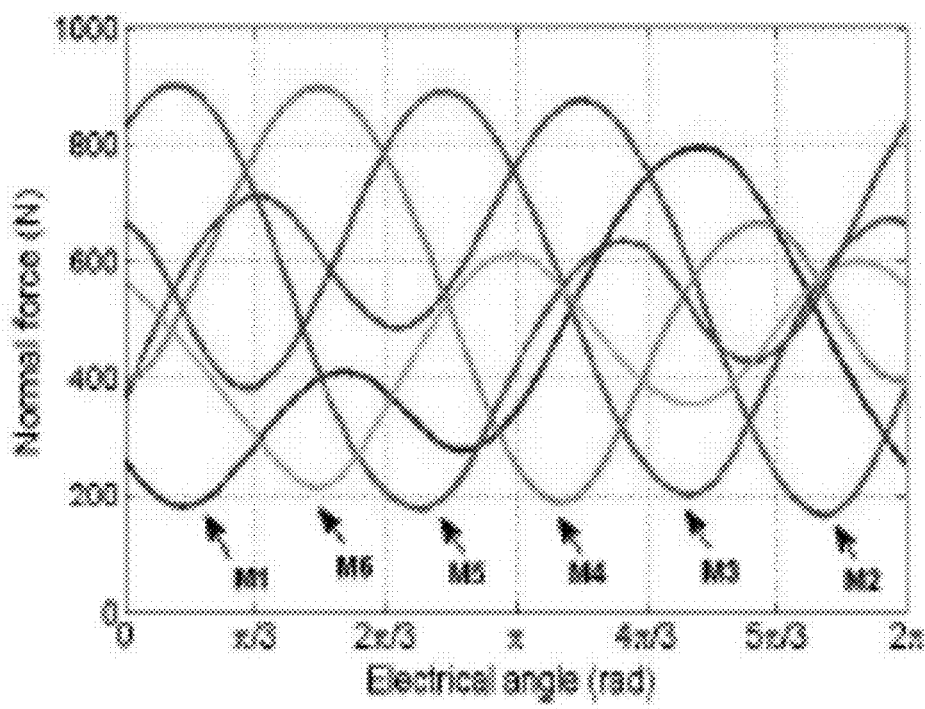
FIG. 56 is a plot showing force as a function of electrical angle.
Figure 57:
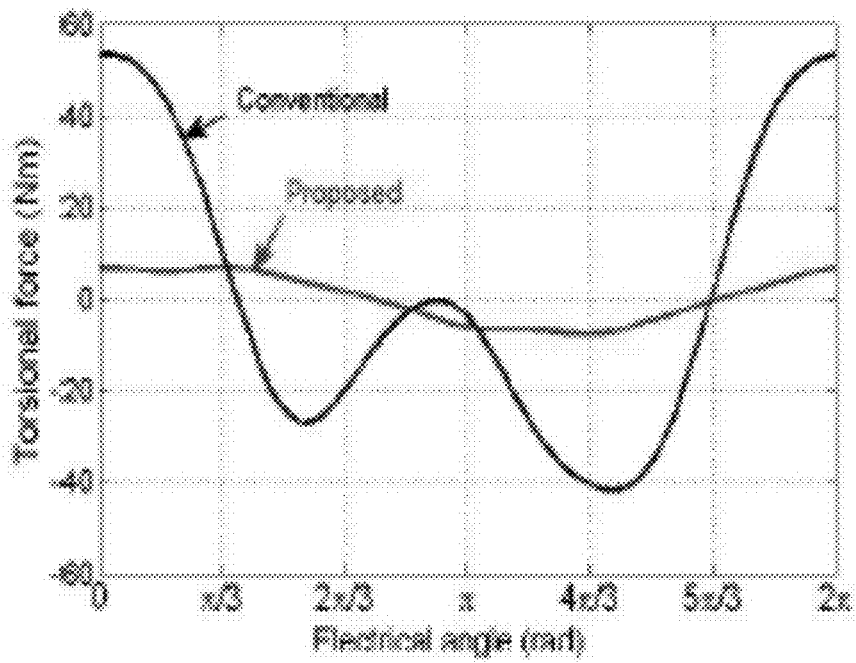
FIG. 57 is a plot showing force as a function of electrical angle.

A force analysis was performed on the optimized FSLSM from Example 8 and the existing FSLSM from Example 6. The normal forces on the translator modules were analyzed using FE analysis. FIG. 55 shows the normal forces on each phase module of the FSLSM of the subject invention, and FIG. 56 shows the normal forces on the modules of the existing FSLSM discussed in Example 6. The individual forces on the translator segments are much lower in the FSLSM of the subject invention at least in part because of the double-sided symmetry. FIG. 57 shows torsional torque with respect to the center of the translator due to the normal forces for the optimized FSLSM of the subject invention discussed in Examples 6-8 (labeled as "Proposed") and the existing FSLSM discussed in Example 6 (labeled as "Conventional"). Thermally conductive epoxy resins (e.g., 50-3185 NC from Epoxies, etc.) can be used as an encapsulator to hold the translator modules together in the FSLSM of the subject invention. Such resins have tensile strengths of more than 8,000 psi and a shore D hardness of more than 94.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] W. Min, J. Chen, Z. Zhu, Y. Zhu, M. Zhang, and G. Duan, "Optimization and comparison of novel e-core and c-core linear switched flux pm machines," Magnetics, IEEE Transactions on, vol. 47, no. 8, pp. 2134-2141, August 2011.

[2] J. Floresta, X.-t. Wang, and D. Bobelis, "High performance slotless electric motor and method for making same," Patent WO/2002/015 229, February, 2002.

[3] S. Dwari and L. Parsa, "An optimal control technique for multiphase pm machines under open-circuit faults," vol. 55, no. 5, pp. 1988-1995, May 2008.

[4] W. Min, J. Chen, Z. Zhu, Y. Zhu, M. Zhang, and G. Duan, "Optimization and comparison of novel e-core and c-core linear switched flux pm machines," Magnetics, IEEE Transactions on, vol. 47, no. 8, pp. 2134-2141, August 2011.

We claim:

1. A flux-switching linear synchronous motor (FSLSM), comprising:
    at least two permanent magnets;
    a coil wrapped around each permanent magnet; and
    at least one stator,
    wherein all permanent magnets of the FSLSM are magnetized in the same direction,
    wherein the permanent magnets are disposed on a first surface of the at least one stator,
    wherein the first surface of the at least one stator extends along the FSLSM in a first direction, and
    wherein each permanent magnet is arranged such that its magnetization direction is parallel to the first direction.

2. The FSLSM according to claim 1, comprising two stators, wherein a first stator is disposed below the permanent magnets and a second stator is disposed above the permanent magnets.

3. The FSLSM according to claim 2, wherein each stator comprises stator teeth and teeth gaps between the stator teeth, wherein the first stator and the second stator are displaced from each other by half a pole pitch such that the stator teeth of the first stator are aligned with the teeth gaps of the second stator and the stator teeth of the second stator are aligned with the teeth gaps of the first stator.

4. The FSLSM according to claim 1, wherein the FSLSM is yokeless.

5. The FSLSM according to claim 1, comprising at least six permanent magnets, wherein the FSLSM is a three-phase FSLSM.

6. The FSLSM according to claim 5, comprising six slots and ten poles.

7. The FSLSM according to claim 1, comprising at least five permanent magnets, wherein the FSLSM is a five-phase FSLSM.

8. A flux-switching linear synchronous motor (FSLSM), comprising:
    at least two permanent magnets;
    a coil wrapped around each permanent magnet; and
    at least one stator,
    wherein all permanent magnets of FSLSM are magnetized in the same direction, and
    wherein all permanent magnets and all coils are encapsulated in a non-magnetic encapsulating material, thereby forming a one-piece translator containing all permanent magnets and all coils of the FSLSM.

9. The FSLSM according to claim 8, wherein the non-magnetic encapsulating material comprises a thermally-conducting resin.

10. The FSLSM according to claim 1, wherein each permanent magnet comprises NdFeB.

11. The FSLSM according to claim 1, wherein the at least one stator comprises steel.

12. A flux-switching linear synchronous motor (FSLSM), comprising:
    at least two permanent magnets;
    a coil wrapped around each permanent magnet; and
    at least one stator,
    wherein all permanent magnets of the FSLSM are magnetized in the same direction,
    wherein a split ratio of the FSLSM is from about 0.27 to about 0.32,
    wherein a stator tooth width ratio of the FSLSM is from about 0.34 to about 0.35,
    wherein a stator tooth height ratio of the FSLSM is from about 0.37 to about 0.40, and
    wherein a translator tooth width ratio of the FSLSM is from about 0.20 to about 0.22.

13. The FSLSM according to claim 1, wherein a pole pitch of the FSLSM is from 20 mm to 30 mm,
    wherein a width of each permanent magnet is from 2.5 mm to 3 mm,
    wherein a height of each permanent magnet is from 30 mm to 40 mm,
    wherein a permanent magnet pole pitch is from 35 mm to 45 mm,
    wherein an air gap is from 0.9 mm to 1.1 mm,
    wherein a width of each stator tooth of the at least one stator is from 8 mm to 9 mm,
    wherein a height of each stator tooth of the at least one stator is from 10 mm to 12 mm, wherein a translator tooth width of the FSLSM is from 18 mm to 20 mm, wherein a magnet residual flux density of the FSLSM is from 1 T to 1.5 T, wherein a machine depth of the FSLSM is from 80 mm to 120 mm, and wherein a translator length of the FSLSM is from 220 mm to 260 mm.

14. The FSLSM according to claim 8, comprising two stators, wherein a first stator is disposed below the permanent magnets and a second stator is disposed above the permanent magnets, wherein each stator comprises stator teeth and teeth gaps between the stator teeth, wherein the first stator and the second stator are displaced from each other by half a pole pitch such that the stator teeth of the first stator are aligned with the teeth gaps of the second stator and the stator teeth of the second stator are aligned with the teeth gaps of the first stator, and wherein the FSLSM is yokeless.

15. The FSLSM according to claim 14, wherein the non-magnetic encapsulating material comprises a thermally-conducting resin, wherein each permanent magnet comprises NdFeB, and wherein each stator comprises steel.

16. The FSLSM according to claim 15, wherein a split ratio of the FSLSM is from about 0.27 to about 0.32, wherein a stator tooth width ratio of the FSLSM is from about 0.34 to about 0.35, wherein a stator tooth height ratio of the FSLSM is from about 0.37 to about 0.40, and wherein a translator tooth width ratio of the FSLSM is from about 0.20 to about 0.22.

17. The FSLSM according to claim 16, wherein a pole pitch of the FSLSM is from 20 mm to 30 mm, wherein a width of each permanent magnet is from 2.5 mm to 3 mm, wherein a height of each permanent magnet is from 30 mm to 40 mm, wherein a permanent magnet pole pitch is from 35 mm to 45 mm, wherein an air gap is from 0.9 mm to 1.1 mm, wherein a width of each stator tooth of the at least one stator is from 8 mm to 9 mm, wherein a height of each stator tooth of the at least one stator is from 10 mm to 12 mm, wherein a translator tooth width of the FSLSM is from 18 mm to 20 mm, wherein a magnet residual flux density of the FSLSM is from 1 T to 1.5 T, wherein a machine depth of the FSLSM is from 80 mm to 120 mm, and wherein a translator length of the FSLSM is from 220 mm to 260 mm.

18. The FSLSM according to claim 8, comprising two stators, wherein a first stator is disposed below the permanent magnets and a second stator is disposed above the permanent magnets.

19. The FSLSM according to claim 8, wherein each stator comprises stator teeth and teeth gaps between the stator teeth, wherein the first stator and the second stator are displaced from each other by half a pole pitch such that the stator teeth of the first stator are aligned with the teeth gaps of the second stator and the stator teeth of the second stator are aligned with the teeth gaps of the first stator.

20. The FSLSM according to claim 8, wherein the FSLSM is yokeless.

* * * * *